United States Patent
Dodge et al.

(10) Patent No.: US 10,580,030 B2
(45) Date of Patent: Mar. 3, 2020

(54) METHODS AND SYSTEMS FOR ANALYZING USER PREFERENCES TO DYNAMICALLY IDENTIFY REMOTELY LOCATED MEDIA FOR LOCAL ACCESS

(75) Inventors: Garrett F. Dodge, Berkeley, CA (US); Ketu N. Patel, Porterville, CA (US); Eugene L. Folgo, III, Redwood City, CA (US)

(73) Assignee: Rockbot, Inc., Oakland, CA (US)

( * ) Notice: Subject to any disclaimer, the term of this patent is extended or adjusted under 35 U.S.C. 154(b) by 526 days.

(21) Appl. No.: 13/115,842

(22) Filed: May 25, 2011

(65) Prior Publication Data
US 2011/0295661 A1 Dec. 1, 2011

Related U.S. Application Data

(60) Provisional application No. 61/348,911, filed on May 27, 2010, provisional application No. 61/442,709, filed on Feb. 14, 2011.

(51) Int. Cl.
*G06Q 30/02* (2012.01)

(52) U.S. Cl.
CPC .................. *G06Q 30/0241* (2013.01)

(58) Field of Classification Search
CPC .................. H04H 60/46; G06Q 30/0241
USPC .............. 705/14.5, 14.55, 14.58, 26.1, 14.53
See application file for complete search history.

(56) References Cited

U.S. PATENT DOCUMENTS

| | | |
|---|---|---|
| 4,414,467 A | 11/1983 | Gould et al. |
| 4,528,643 A | 7/1985 | Freeny, Jr. |
| 4,553,211 A | 11/1985 | Kawasaki et al. |
| 4,905,280 A | 2/1990 | Wiedemer |
| 5,150,817 A | 9/1992 | Livingston |
| 5,219,094 A | 6/1993 | Labriola |
| 5,291,554 A | 3/1994 | Morales |
| 5,323,448 A | 6/1994 | Biggs et al. |

(Continued)

FOREIGN PATENT DOCUMENTS

| | | |
|---|---|---|
| WO | 2008070787 A2 | 6/2008 |
| WO | WO11004185 | 1/2011 |

OTHER PUBLICATIONS

Kukec, A. M. (Jul. 6, 2006). AT&T dabbles in music TouchTunes' deal brings broadband to digital jukeboxes. Daily Herald Arlington Heights, IL). Retrieved on Sep. 28, 2019. Retrieved from: <http://dialog.proquest.com/professional/docview/670012669?accountid=142257> (Year: 2006).*

Extended European Search Report and Written Opinion for EP 11 78 7362, dated Jul. 30, 2014, 7 pages.

Kurkovsky, S. et al., "Using ubiquitous computing in interactive mobile marketing," Personal and Ubiquitous Computing, May 2006, vol. 10, Issue 4, pp. 227-240.

(Continued)

*Primary Examiner* — James M Detweiler
*Assistant Examiner* — Monica A Mandel
(74) *Attorney, Agent, or Firm* — Blueshift IP, LLC; Cynthia M. Gilbert

(57) ABSTRACT

A method enables analyzing user preferences to dynamically identify remotely located media for local access. The method includes accessing, by a media selection component executing on a first computing device, an identification of a type of media preferred by a user local to a second computing device. The method includes identifying, by the media selection component, remotely located media of the type preferred by the user. The method includes providing, by a media player executing on the second computing device, local access to the identified remotely located media.

5 Claims, 12 Drawing Sheets

(56) References Cited

U.S. PATENT DOCUMENTS

| | | |
|---|---|---|
| 5,339,250 A | 8/1994 | Durbin |
| 5,341,350 A | 8/1994 | Frank et al. |
| 5,355,302 A | 10/1994 | Martin et al. |
| 5,415,319 A | 5/1995 | Risolia |
| 5,440,336 A | 8/1995 | Buhro et al. |
| 5,445,295 A | 8/1995 | Brown |
| 5,475,740 A | 12/1995 | Biggs, Jr. et al. |
| 5,481,509 A | 1/1996 | Knowles |
| 5,519,435 A | 5/1996 | Anderson |
| 5,521,631 A | 5/1996 | Budow et al. |
| 5,528,282 A | 6/1996 | Voeten et al. |
| 5,629,867 A | 5/1997 | Goldman |
| 5,633,839 A | 5/1997 | Alexander et al. |
| 5,641,319 A | 6/1997 | Stoel et al. |
| 5,644,714 A | 7/1997 | Kikinis |
| 5,647,505 A | 7/1997 | Scott |
| 5,661,517 A | 8/1997 | Budow et al. |
| 5,675,738 A | 10/1997 | Suzuki et al. |
| 5,745,556 A | 4/1998 | Ronen |
| 5,748,485 A | 5/1998 | Christiansen et al. |
| 5,769,269 A | 6/1998 | Peters |
| 5,781,889 A | 7/1998 | Martin et al. |
| 5,794,217 A | 8/1998 | Allen |
| 5,798,785 A | 8/1998 | Hendricks et al. |
| 5,809,246 A | 9/1998 | Goldman |
| 5,831,862 A | 11/1998 | Hetrick et al. |
| 5,848,398 A | 12/1998 | Martin et al. |
| 5,911,043 A | 6/1999 | Duffy et al. |
| 5,914,712 A | 6/1999 | Sartain et al. |
| 5,930,765 A | 7/1999 | Martin |
| 5,945,987 A | 8/1999 | Dunn |
| 5,959,945 A | 9/1999 | Klieman |
| 5,999,207 A | 12/1999 | Rodriguez et al. |
| 6,067,562 A | 5/2000 | Goldman |
| 6,163,795 A | 12/2000 | Kikinis |
| 6,172,948 B1 | 1/2001 | Keller et al. |
| 6,232,539 B1 | 5/2001 | Looney et al. |
| 6,248,946 B1 | 6/2001 | Dwek |
| 6,269,394 B1 | 7/2001 | Kenner et al. |
| 6,295,555 B1 | 9/2001 | Goldman |
| 6,381,575 B1 | 4/2002 | Martin et al. |
| 6,392,664 B1 | 5/2002 | White et al. |
| 6,397,189 B1 | 5/2002 | Martin et al. |
| 6,430,537 B1 | 8/2002 | Tedesco et al. |
| 6,484,148 B1 | 11/2002 | Boyd |
| 6,507,727 B1 | 1/2003 | Henrick |
| 6,578,051 B1 | 6/2003 | Mastronardi et al. |
| 6,587,403 B1 | 7/2003 | Keller et al. |
| 6,598,230 B1 | 7/2003 | Ballhorn |
| 6,611,654 B1 | 8/2003 | Shteyn |
| 6,628,302 B2 | 9/2003 | White et al. |
| 6,647,417 B1 | 11/2003 | Hunter et al. |
| 6,650,963 B2 | 11/2003 | DiLorenzo |
| 6,755,744 B1 | 6/2004 | Nathan et al. |
| 6,876,901 B2 | 4/2005 | DiLorenzo |
| 6,879,963 B1 | 4/2005 | Rosenberg |
| 6,898,161 B1 | 5/2005 | Nathan |
| 6,931,451 B1 | 8/2005 | Logan |
| 6,970,834 B2 | 11/2005 | Martin et al. |
| 7,000,735 B2 | 2/2006 | Meyer |
| 7,028,082 B1 | 4/2006 | Rosenberg et al. |
| 7,076,561 B1 | 7/2006 | Rosenberg et al. |
| 7,107,109 B1 | 9/2006 | Nathan et al. |
| 7,124,194 B2 | 10/2006 | Nathan et al. |
| 7,130,892 B2 | 10/2006 | Mukai |
| 7,133,924 B1 | 11/2006 | Rosenberg et al. |
| 7,143,430 B1 | 11/2006 | Fingerman et al. |
| 7,158,169 B1 | 1/2007 | Farber et al. |
| 7,167,857 B2 | 1/2007 | Roberts |
| 7,188,352 B2 | 3/2007 | Nathan et al. |
| 7,205,471 B2 | 4/2007 | Looney et al. |
| 7,206,417 B2 | 4/2007 | Nathan |
| 7,210,141 B1 | 4/2007 | Nathan et al. |
| 7,216,178 B2 | 5/2007 | Juskiewicz |
| 7,222,183 B2 | 5/2007 | Juskiewicz |
| 7,231,656 B1 | 6/2007 | Nathan |
| 7,249,147 B2 | 7/2007 | Juszkiewicz |
| 7,275,256 B1 | 9/2007 | Del Beccaro et al. |
| 7,289,393 B2 | 10/2007 | Keller et al. |
| 7,293,277 B1 | 11/2007 | Nathan |
| 7,302,468 B2 | 11/2007 | Wijeratne |
| 7,308,485 B2 | 12/2007 | Roberts et al. |
| 7,321,923 B1 | 1/2008 | Rosenberg et al. |
| 7,325,043 B1 | 1/2008 | Rosenberg et al. |
| 7,346,558 B2 | 3/2008 | Rosenberg |
| 7,356,831 B2 | 4/2008 | Nathan |
| 7,401,030 B1 | 7/2008 | Mather et al. |
| 7,424,731 B1 | 9/2008 | Nathan et al. |
| 7,430,554 B1 | 9/2008 | Heisinger, Jr. |
| 7,441,192 B2 | 10/2008 | Pisz |
| 7,448,057 B1 | 11/2008 | Nathan |
| 7,490,775 B2 | 2/2009 | Biderman |
| 7,512,632 B2 | 3/2009 | Mastronardi et al. |
| 7,519,442 B2 | 4/2009 | Nathan et al. |
| 7,548,851 B1 | 6/2009 | Lau et al. |
| 7,549,919 B1 | 6/2009 | Nathan et al. |
| 7,555,539 B1 | 6/2009 | Rosenberg et al. |
| 7,574,727 B2 | 8/2009 | Nathan et al. |
| 7,577,717 B2 * | 8/2009 | Smith ............................ 709/218 |
| 7,617,295 B1 | 11/2009 | Farber et al. |
| 7,626,609 B1 | 12/2009 | Farber et al. |
| 7,642,443 B2 | 1/2010 | Gould et al. |
| 7,643,057 B2 | 1/2010 | Farber et al. |
| 7,647,613 B2 | 1/2010 | Drakoulis et al. |
| 7,657,910 B1 | 2/2010 | McAuley et al. |
| 7,668,538 B2 | 2/2010 | Rosenberg et al. |
| 7,680,902 B2 | 3/2010 | Roberts et al. |
| 2004/0133480 A1* | 7/2004 | Domes .............. G06Q 30/0601 |
| | | 705/26.1 |
| 2004/0158860 A1 | 8/2004 | Crow |
| 2005/0021470 A1 | 1/2005 | Martin et al. |
| 2005/0044254 A1* | 2/2005 | Smith ............................ 709/231 |
| 2006/0018209 A1 | 1/2006 | Drakoulis et al. |
| 2006/0062094 A1 | 3/2006 | Nathan et al. |
| 2006/0095516 A1 | 5/2006 | Wijeratne |
| 2006/0224619 A1 | 10/2006 | Jeong et al. |
| 2007/0143482 A1 | 6/2007 | Zancho |
| 2007/0156676 A1 | 7/2007 | Rosenberg |
| 2007/0161402 A1* | 7/2007 | Ng .......................... H04L 67/06 |
| | | 455/554.2 |
| 2007/0214182 A1* | 9/2007 | Rosenberg ................. 707/104.1 |
| 2007/0244880 A1 | 10/2007 | Martin et al. |
| 2007/0288470 A1 | 12/2007 | Kauniskangas et al. |
| 2008/0004951 A1 | 1/2008 | Huang et al. |
| 2008/0086379 A1* | 4/2008 | Dion et al. ....................... 705/14 |
| 2008/0091717 A1 | 4/2008 | Garbow et al. |
| 2008/0155587 A1 | 6/2008 | Sokola et al. |
| 2009/0056525 A1 | 3/2009 | Oppenheimber |
| 2009/0138805 A1 | 5/2009 | Hildreth |
| 2010/0131895 A1 | 5/2010 | Wohlert |
| 2010/0228740 A1 | 9/2010 | Cannistraro et al. |
| 2010/0318544 A1 | 12/2010 | Nicolov |

OTHER PUBLICATIONS

Patent Examination Report No. 1 for AU2011258252, dated Jul. 16, 2014, 3 pages.
Patent Examination Report No. 2 for AU2011258252, dated Jul. 7, 2015, 6 pages.
Office Action dated Jan 22, 2018 in Canadian Application No. 2795552, 5 pages.
Examination Report dated Dec. 21, 2018 in Canadian patent application No. 2795552, 7 pages.
Examination Report issued by the European Patent Office dated May 28, 2018, in European patent application No. 11787362.0, 7 pages.
Summons to attend oral proceedings pursuant to Rule 115(1) EPC, mailed Jun. 4, 2019, in European Patent Application No. 11787362.0, 8 pages.

* cited by examiner

METHODS AND SYSTEMS FOR ANALYZING USER PREFERENCES TO DYNAMICALLY IDENTIFY REMOTELY LOCATED MEDIA FOR LOCAL ACCESS

CROSS-REFERENCE TO RELATED APPLICATIONS

This application claims priority from U.S. Provisional Patent Application Ser. No. 61/348,911, filed on May 27, 2010, entitled "A System and Method for Providing an Interactive, Socially-Networked Digital Media Service in Public Venues," and to U.S. Provisional Patent Application Ser. No. 61/442,709, filed on Feb. 14, 2011, entitled "A System and Method for Capturing Media Preferences and Altering Upcoming Media in Public and Private Settings," each of which is hereby incorporated by reference.

BACKGROUND

The disclosure relates to methods and systems for dynamically identifying remotely located media. More particularly, the methods and systems described herein relate to analyzing user preferences to dynamically identify remotely located media for local access.

Typical public entertainment venues—such as bars, cafes, or bowling alleys—have audiovisual reproduction systems. These systems are commonly composed of a sound reproduction machine that is linked to a monitor that displays video images. The sound reproduction machine is usually equipped with a library of physical media contained on compact discs, DVD, Blue Ray, or other digital storage systems, as is increasingly common, equipped to receive a stream via satellite channel or internet-connected radio. This machine will commonly have mechanical or digital selection buttons that a consumer can use to locate the available musical titles. A consumer pays the required fee and then selects one or more pieces from the library. The machine then locates the selected media and plays it in the order in which the request was received.

There are several drawbacks to these conventional systems. The machines are usually bulky because of the large amount of space needed to store a physical library. This typically makes the systems impractical for smaller venues. Additionally, these systems use mechanical hardware that has high fault rates and is subject to failure. Furthermore, the physical library is generally difficult and expensive to update. This is a significant drawback because the public's demand for particular pieces is constantly changing and conventional systems make it prohibitively expensive to eliminate pieces in the library that are rarely played or to add newly popular media.

Digital jukeboxes have more recently been developed that provide a larger selection of media files, and a more efficient means of updating the media library that does not generally involve service calls. Some of these digital jukeboxes use a client-server software system that allows an operator to manage its jukeboxes through a central control system. However, there are drawbacks to these systems as well. One drawback to such systems is that typically the stream of media played in a venue is pre-programmed by an editor who dictates the collection of media that they think will be most entertaining to people in the venue—without having access to a system that recognizes individuals within the venue or those individuals' media preferences. The systems are typically complicated, bulky, and expensive. Further, they require a customer to locate the device within a venue and learn how to navigate an unfamiliar system before making a purchase. Many of these systems operate primarily as digital advertising screens with only a secondary component devoted to providing entertainment media. These systems do not typically provide continuous music—or do so at a prohibitively high cost. Many venues find these large advertising screens unseemly and an ill fit to the atmosphere in their venue. Additionally, these systems operate in isolation from each other, and do not typically implement any of the social networking features that users desire, nor do they allow for data collection and analysis to provide opportunities for monetization and enhanced consumer engagement.

BRIEF SUMMARY

In one aspect, the methods and systems described herein provide a digital media service in public venues. In one embodiment, a system provides a virtual media-delivery system, that utilizes mobile computing, distributed network systems, cloud-computing, and third-party social networking technologies to replace the need for a physical jukebox in a venue and to provide a more interactive, engaging, social, and entertaining experience to end users and venue owners. In some embodiments, a venue uses the system to select media when no users have made specific requests for particular media. In one of these embodiments, the system gathers information about individuals within the venue and the individuals' media preferences, identifies types of media preferred by the individuals within the venue and dynamically generates a play list of media including media of the preferred types. In another of these embodiments, users engage with the system through their personal computing devices and vote on the media playing over a shared audio or video system; votes are then used to select, order, arrange, combine, or divide the media that plays in the venue.

In another aspect, the methods and systems described herein provide functionality for capturing media preferences of users in a public or private group setting, such as a public venue, conference, retail establishment, private party, club, or church gathering. In one embodiment, the system identifies individuals in a defined space (a venue), collects the individuals' preferences, and dynamically creates a stream of media to play over an audiovisual system in the venue.

In still another aspect, a system for analyzing user preferences to dynamically identify remotely located media for local access includes a media selection component and a media player. The media selection component executes on a first computing device and accesses an identification of a type of media preferred by a user local to a second computing device. The media selection component identifies remotely located media of the type preferred by the user. The media player executed on the second computing device and provides local access to the identified remotely located media. In one embodiment, the media player plays a streamed version of the identified, remotely located media.

In still another aspect, a method for analyzing user preferences to dynamically identify remotely located media for local access includes accessing, by a media selection component executing on a first computing device, an identification of a type of media preferred by a user local to a second computing device. The method includes identifying, by the media selection component, remotely located media of the type preferred by the user. The method includes providing, by a media player executing on the second computing device, local access to the identified remotely located media.

In one aspect, a method for analyzing user preferences to dynamically identify remotely located media for local access includes accessing, by a media selection component executing on a first computing device, an identification of a type of media preferred by a first user local to a second computing device. The method includes identifying, by the media selection component, remotely located media of the type preferred by the first user. The method includes directing, by the media selection component, a media player executing on a third computing device, to broadcast the identified remotely located media at a venue, the third computing device and the second computing device located within the venue. The method includes receiving, by the media selection component, from a second user in the venue, a payment to increase a level of priority of the second user over a level of priority of the first user. The method includes accessing, by the media selection component, an identification of a second type of media preferred by the second user, responsive to the received payment. The method includes identifying, by the media selection component, remotely located media of the second type, responsive to the received payment. The method includes directing, by the media selection component, the media player to broadcast the identified remotely located media of the second type, responsive to the received payment.

In one aspect, a system for analyzing user preferences to dynamically identify remotely located media for local access includes a media selection component and a media player. The media selection component executes on a first computing device, accesses an identification of a type of media preferred by a first user local to a second computing device in a venue, identifies remotely located media of a type preferred by the first user, initiates a broadcast of the identified remotely located media, receives from a second user at the venue a payment to increase a level of priority of the second user over a level of priority of the first user, accesses an identification of a second type of media preferred by the second user, and identifies remotely located media of the second type. The media player executing on a third computing device broadcasts the identified remotely located media of the second type, at a venue, the third computing device located within the venue.

In still another aspect, a method for analyzing user preferences to dynamically identify remotely located media for local access includes accessing, by a media selection component executing on a first computing device, an identification of a type of media preferred by a first user local to a second computing device. The method includes identifying, by the media selection component, a plurality of remotely located media of the type preferred by the first user. The method includes directing, by the media selection component, a media player executing on a third computing device to broadcast a first item in the plurality of identified remotely located media at a venue, the third computing device and the second computing device located within the venue. The method includes receiving, by the media selection component, from a second user in the venue, a payment and a request to broadcast a remotely located media file. The method includes directing, by the media selection component, the media player to broadcast the remotely located media file in the venue, responsive to the received payment. The method includes directing, by the media selection component, the media player to broadcast a second item in the plurality of identified remotely located media.

In another aspect, a method for analyzing user preferences to dynamically identify remotely located media for local access includes accessing, by a media selection component executing on a first computing device, an identification of a type of media preferred by a first user local to a second computing device, the first user having a level of priority. The method includes identifying, by the media selection component, remotely located media of the type preferred by the first user. The method includes directing, by the media selection component, a media player executing on a third computing device to broadcast the identified remotely located media at a venue, the third computing device and the second computing device located within the venue. The method includes monitoring, by the media selection component, a level of interaction between a second user in the venue and the media selection component. The method includes determining that the second user has a higher level of priority than the first user, responsive to the monitoring. The method includes accessing, by the media selection component, an identification of a second type of media preferred by the second user. The method includes identifying, by the media selection component, remotely located media of the second type. The method includes directing, by the media selection component, the media player to broadcast the identified remotely located media of the second type.

In still another embodiment, a method for analyzing user preferences to dynamically identify remotely located media for local access includes analyzing a level of historical interactions between each of a plurality of users and a media selection component executing on a first computing device. The method includes assigning, by the media selection component, a level of priority to each of the plurality of users responsive to the analysis. The method includes receiving, by the media selection component, an indication that a subset of the plurality of users is in a venue. The method includes identifying, by the media selection component, a user in the subset having a level of priority higher than the level of priority assigned to the other users. The method includes accessing, by the media selection component, an identification of a type of media preferred by the identified user. The method includes identifying, by the media selection component, remotely located media of the type preferred by the identified user. The method includes directing, by the media selection component, a media player executing on a third computing device to broadcast the identified remotely located media at the venue, the third computing device within the venue.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
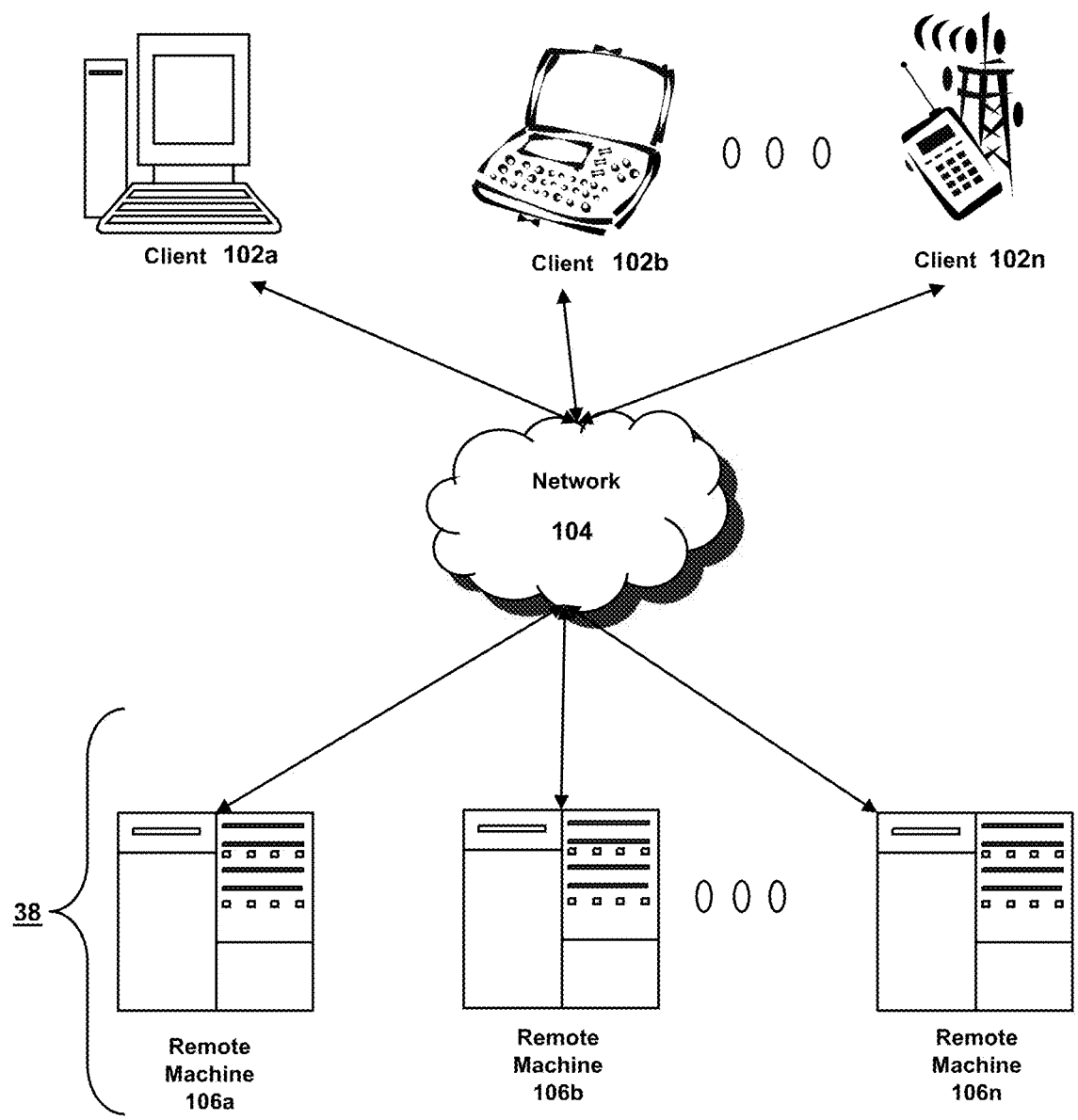
FIG. 1A-1D are block diagrams depicting embodiments of computers useful in connection with the methods and systems described herein.

In some embodiments of the methods and systems described herein, functionality is provided for accessing, via an Internet enabled device, virtual media that is hosted in a cloud network. In one of these embodiments, this functionality includes social networking features to provide a more interactive, engaging, social, and entertaining experience to end users and venue owners Before describing methods and systems for analyzing user preferences to dynamically identify remotely located media for local access in detail, a description is provided of a network in which such methods and systems may be implemented. Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106, computing device(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38. In another of these embodiments, the remote machines 106 may be geographically dispersed. In other embodiments, a server farm 38 may be administered as a single entity. In still other embodiments, the server farm 38 comprises a plurality of server farms 38. The remote machines 106 within each server farm 38 can be heterogeneous—one or more of the remote machines 106 can operate according to one type of operating system platform (e.g., WINDOWS NT, manufactured by Microsoft Corp. of Redmond, Wash.), while one or more of the other remote machines 106 can operate on according to another type of operating system platform (e.g., Unix or Linux).

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection.

Figure 1B:
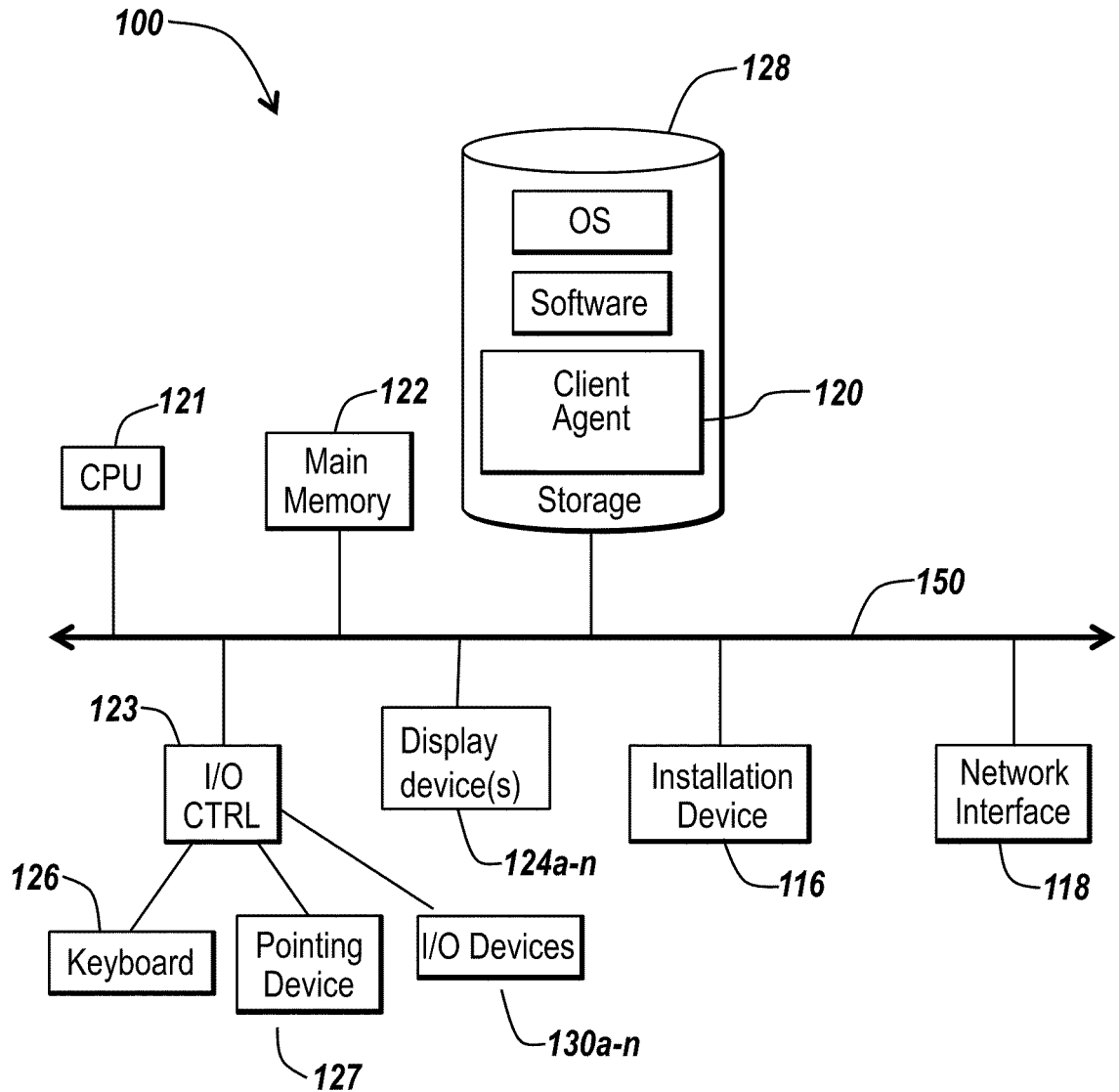
Figure 1C:
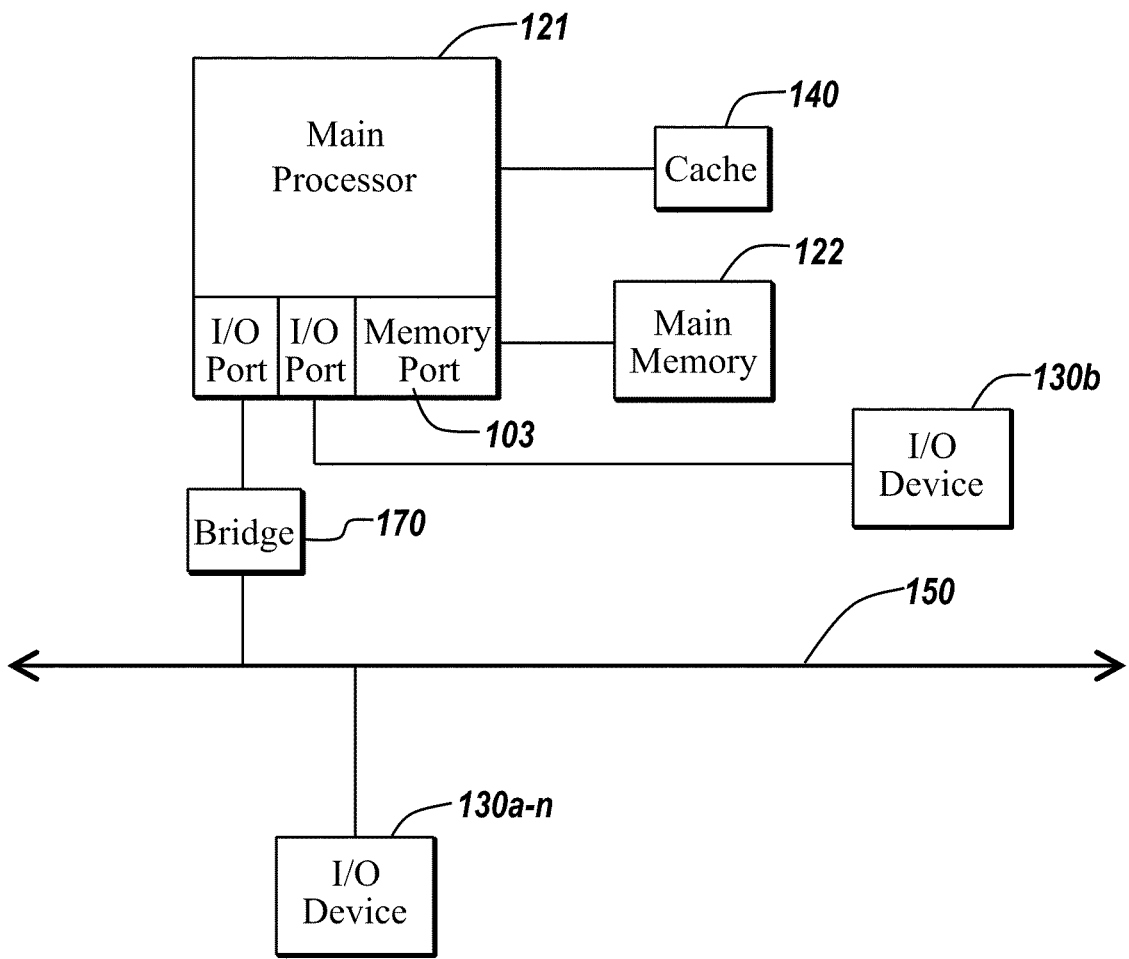

The client 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, scanners, cameras and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, a computer 100 connects to a second computer 100' on a network using any one of a number of well-known protocols from the GSM or CDMA families, such as W-CDMA. These protocols support commercial wireless communication services and W-CDMA, in particular is the underlying protocol supporting i-Mode and mMode services, offered by NTT DoCoMo.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. In some embodiments, any portion of the operating system of the computing device 100 may be configured for using multiple displays 124a-124n. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7 and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

Figure 1D:
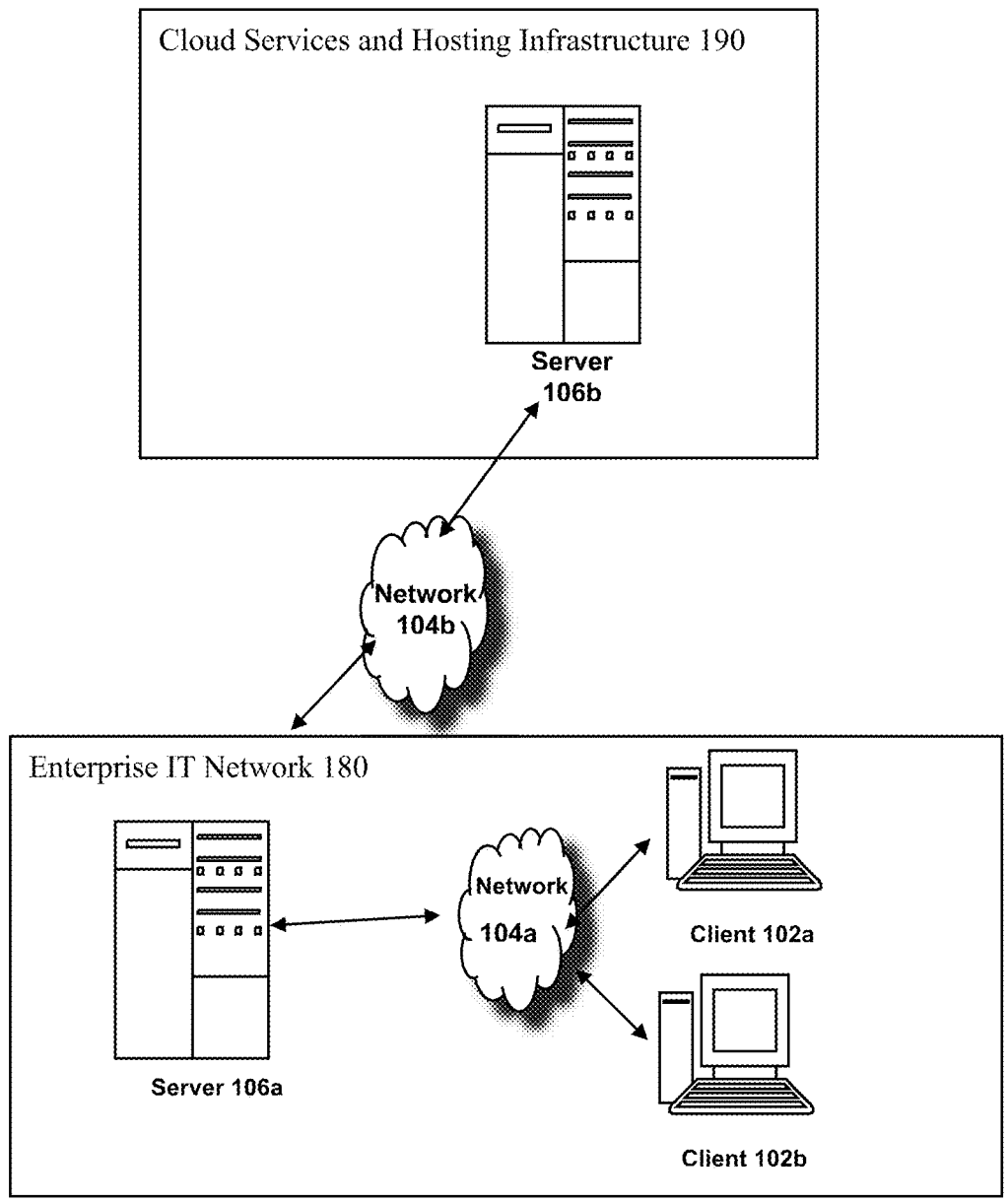

Referring now to FIG. 1D, an embodiment of a network useful in connection with the methods and systems described herein is shown in which certain infrastructure and services are distributed across two or more networks. In brief overview, the system includes an enterprise IT network 180 and a cloud services and hosting infrastructure 190. The enterprise IT network 180 may include the servers 106 maintained by, for example, a public entertainment venue, and the client devices which the venue allows to connect to its server across network 104a. For example, a bar may include a server computer that can be used to play music; the bar may also allow patrons to connect over a network to the server computer to make requests for music. The cloud services and hosting infrastructure 190 may provide additional services required by the enterprise IT network 180. In one embodiment, a cloud services and hosting infrastructure 190 provides access to, without limitation, storage systems, databases, application servers, desktop servers, directory services, and web servers. Continuing with the previous example, owners of a bar may choose to have their internal emailing, invoicing, banking, or other management services provided by a cloud services and hosting infrastructure 190 rather than acquiring and maintaining each of those systems themselves.

As depicted in FIG. 1D, in some embodiments, a cloud services and hosting infrastructure 190 is remotely located from an organization that it supports; for example, the cloud services and hosting infrastructure 190 may reside on a second network 104b, while the enterprise IT network 180 forms a separate network 104a. Although FIG. 1D depicts only one sever 106a, one server 106b, two clients 102, and two networks 104, it should be understood that the system may provide multiple ones of any or each of those components. The servers 106, clients 102, and networks 104 may be provided as described above in connection with FIGS. 1A-1C.

In some embodiments, therefore, an IT infrastructure may extend from a first network—such as a network owned and managed by an enterprise—into a second network, which may be owned or managed by a separate entity than the entity owning or managing the first network. Resources provided by the second network may be said to be "in a cloud". Cloud-resident elements may include, without limitation, storage devices, servers, databases, computing environments (including virtual machines and desktops), and applications. In other embodiments, one or more networks providing computing infrastructure on behalf of customers is referred to a cloud. In still other embodiments, Internet-based applications (which may be provided via a "software-as-a-service" model) may be referred to as cloud-based resources. In further embodiments, a resource may be cached in a local network and stored in a cloud. Alternatively, a resource may be streamed to a local network from a cloud.

Figure 2A:
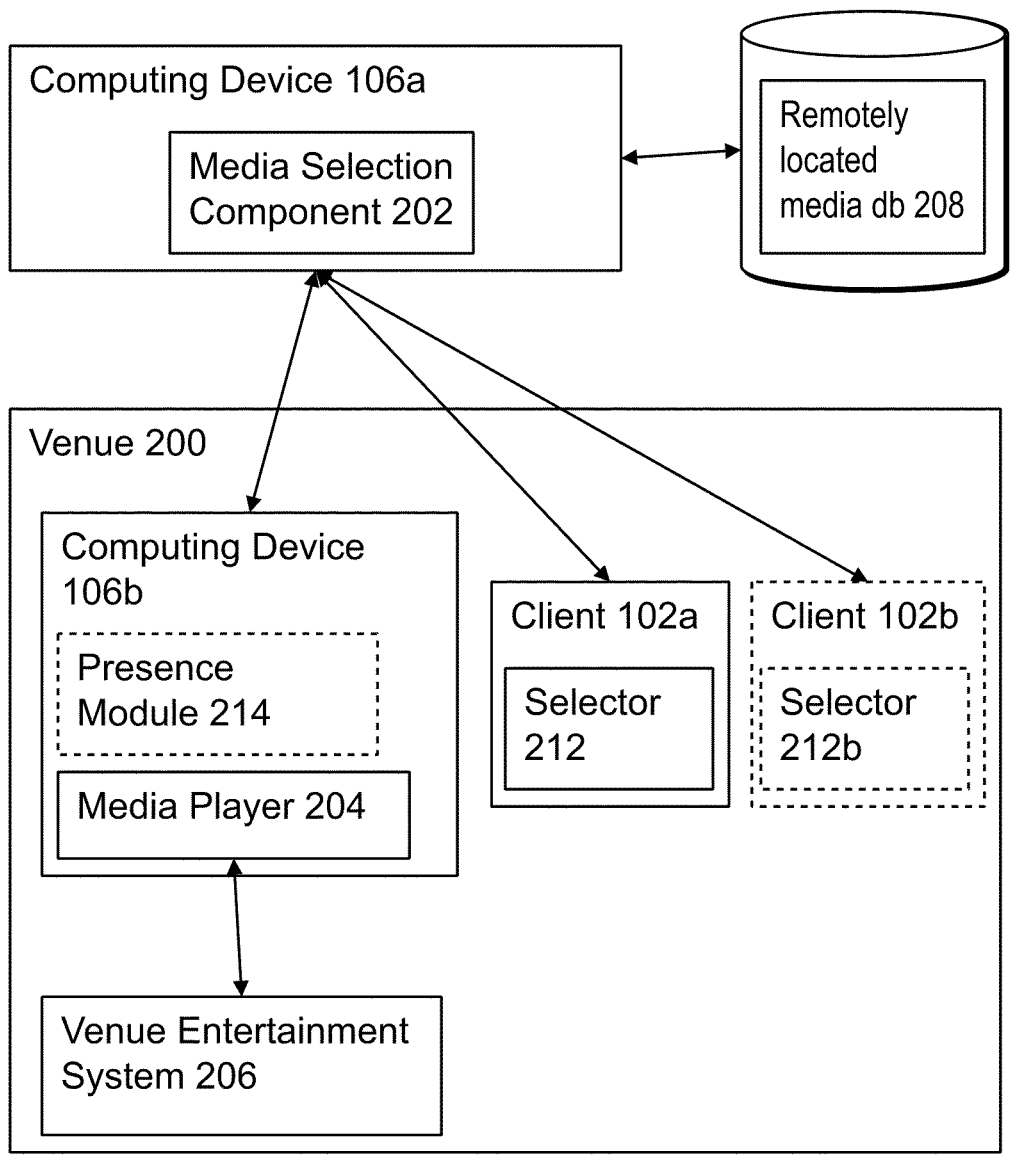
FIG. 2A is a block diagram depicting an embodiment of a system for analyzing user preferences to dynamically identify remotely located media for local access.

Referring now to FIG. 2A, a block diagram depicts one embodiment of a system for analyzing user preferences to dynamically identify remotely located media for local access. The system includes a computing device 106a, a media selection component 202, a venue 200, a computing device 106b, a media player 204, a venue entertainment system 206, a remotely located media database 208, a selector 212, and a first client 102a. In some embodiments, and as depicted in shadow in FIG. 2A, the system includes a second client 102b executing a second selector 212b. The media selection component 202 executes on the first computing device 106a, accesses an identification of a type of media preferred by a user local to a second computing device, (e.g., the user of the first client 102a) and identifies remotely located media of the type preferred by the user. The media player 204 executes on the second computing device 106b and provides local access to the identified remotely located media.

In brief overview, the media selection component 202, executing on a first computing device 106a, accesses an identification of a type of media preferred by a first user local to a second computing device 102a, identifies remotely located media of a type preferred by the first user, initiates a broadcast of the identified remotely located media, receives from a second user at the venue 200 a payment to increase a level of priority of the second user over a level of priority of the first user, accesses an identification of a second type of media preferred by the second user, and identifies remotely located media of the second type. The media player 204 broadcasts the identified remotely located media of the second type, at the venue 200, the third computing device and the second computing device located within the venue 200.

Referring now to FIG. 2A, and in greater detail, the media selection component 202 communicates with at least one client 102a and with the media player 204. The media selection component 202 accesses an identification of a type of media preferred by a user local to the second computing device 106b. The media selection component 202 identifies remotely located media of the type preferred by the user. In one embodiment, the media selection component 202 directs the media player 204 to play the identified remotely located media; for example, the media selection component 202 may direct the computing device 106a to transmit an instruction to the computing device 106b, instructing the media player 204 to play the identified remotely located media.

In some embodiments, the media selection component 202 includes a data collection component (not shown). In one of these embodiments, the data collection component collects user preference data for analysis. In another of these embodiments, the data collection component retrieves the identification of the type of media preferred by the user local to the second computing device 106b. In still another of these embodiments, the data collection component receives the identification of the type of media preferred by the user from a third computing device 106c or from the client device 102a. For example, the user may elect to install and execute client-side software that scans the user's computing device, generates the identification of the type of media preferred by the user and transmits the identification to the media selection component 202.

In other embodiments, the media selection component 202 includes a recommendation engine (not shown) that analyzes data about a user (e.g., user selections, votes, venue preferences, media preferences) to identify the remotely located media of the type of preferred by the user. In one of these embodiments, the recommendation engine is in communication with the data collection component. In another of these embodiments, the recommendation engine accesses a storage medium in which the data collection component has stored data about the user. In still another of these embodiments, a client application (e.g., the selector 212) communicates with the recommendation engine via an application programming interface.

In some embodiments, a third computing device 106c (not shown), in communication with the media selection component 202, stores at least one identification of a type of media preferred by the user. In one of these embodiments, the media selection component 202 accesses the third computing device 106c and retrieves the at least one identification of the type of media preferred by the user. For example, a third party system operating the third computing device 106c may offer a service through which the user purchases new media; such a system may store data that keeps track of what types of songs the user likes.

In one embodiment, the computing device 106a (on which the media selection component 202 executes) stores a remotely located media database 208. In another embodiment, a computing device 106a communicates across a second network 104b with a fourth computing device 106d (not shown) that stores the remotely located media database 208; the fourth computing device 106d may be directly maintained by the entity maintaining the computing device 106a or it may be maintained by a third party under the direction and control of the entity maintaining the computing device 106a. Third party services for hosting and/or maintaining a remotely located media database 208 include, for example and without limitation, those provided by companies such as appliedSB/VerveLife of Chicago, Ill., USA; Limelight Networks, Inc., of Tempe, Ariz., USA.

In still another embodiment, a file in the remotely located media database 208 is delivered to a venue's media player 204 in an on-demand or streaming manner.

In some embodiments, the remotely located media database 208 includes only media available to a first venue 200—that is, each venue 200 may have a dedicated database 208. In other embodiments, the remotely located media database 208 includes music available to multiple venues. In one of these embodiments, a user interface for viewing the media stored within the remotely located media database 208 displays (e.g., to an administrator for a venue 200) an enumeration of a subset of all the media stored in the database 208; the user interface may display a second enumeration of a second subset of all the media to an administrator for a venue 210. Media may include, without limitation, audio files, video files, audiovisual files, movies, music, audiobooks, and files containing a live broadcast of an event (such as, without limitation, a musical or sporting event), applications (e.g., trivia games).

In one embodiment, to populate the remotely located media database 208 that will be accessible to the selector 212, a venue selects a subset of music from an expansive digital media file catalogue. In another embodiment, to populate the remotely located media database 208 that will be accessible to the selector 212, the media selection component 202 can dynamically generate a music selection based on identifiable data associated with the files, including but not limited to, genre, and artists or dynamic criteria such as the song selection history, or library of users who have previously visited the venue. In some embodiments, methods and systems described herein allow for the innovative creation of highly targeted, dynamic play lists for venues that reflect the demonstrated media preferences of their target customers.

In one embodiment, the venue 200 has a portion of its catalogue devoted to new media. In this embodiment, at specified intervals, the media selection component 202 will update the selectable media stored in the remotely located media database 208 for the venue 202 with new media files. These new files may be filtered by genre, artists, or any other metadata or characteristics.

Additionally, the new media portion of the catalogue can be sponsored by the artists, promoters, or be editorially selected. For example, a sponsor may pay to insert promotional plays at a venue 200. The system may allow the sponsor to identify particular venues or particular times at which the promotional play is to be broadcast. In one embodiment, the system may display a user interface with which a user identifies an item for promotion (e.g., media or artist) and provides details regarding the requested promotion (such as time, date, region, and venue). In another embodiment, the user participates in a bidding system to acquire promotional rights on specific times or at specific locations (e.g., paying more to promote a song on a Friday night at a popular venue). In still another embodiment, the media selection component 202 analyzes the request to determine a location satisfying the request at which to play the media. For example, the media selection component 202 may receive a request to promote media, analyze the media and any metadata associated with the media, determine a type of user most likely to prefer the media, and select a venue to play the media and a time during which to play the media when a predetermined number of users will be present. The media selection component 202 may analyze data about types of media preferred by a user or may analyze data about a level of influence the user has on other users.

In one embodiment, an administrative console allows management or employees of the venue 200 to view file data for media files in the remotely located media database 208. The administrative console may execute on the computing device 106b within the venue. Alternatively, the administrative console may execute on the computing device 106a and provide a web interface allowing a user to interact with the administrative console via the Internet. The administrative console may also allow venue owners to view file data for files not stored in the venue's remotely located media database 208, e.g., the system's entire library of cloud-based files, including music available to other venues. Venues can choose to automatically or manually remove files from their catalogues that have not been played over a specified period of time. Media files may be added to the database 208 that is available to a particular venue 200 in a manual or automated fashion. For example, a venue 200 may chose to automatically remove files that have not been played for one month and have these replaced by popular files from the same artists or in the same genre as identified by metadata associated with the files.

In one embodiment, the computing device 106b executes a presence module 214 (depicted in shadow in FIG. 2A) that tracks the presence of a user in the venue. For example, a user may transmit a message from the selector 212 to the presence module 214 indicating that the user is physically located within the venue 200. In another embodiment, the presence module is in communication with the media selection component 202. In some embodiments, the media selection component 202 uses data received from the presence module to determine which users are located near the media player 204 or the computing device 106b. In other embodiments, the media selection component 202 uses data received from the presence module to determine what type of media to play. In further embodiments, the selector 212 executes the presence module 214 (not shown).

The media player 204 is in communication with the media selection component 202. The media player 204 may access data stored by the media selection component 202, including but not limited to, data associated with media files, metadata, venue information, user information, social networking data and gaming statistics. In one embodiment, the media player 204 plays a streamed version of the identified, remotely located media. In another embodiment, the media player 204 is provided as software executing on a computing device such as the computing device 100 described above in connection with FIGS. 1A-1D. In still another embodiment, the media player 204 is provided as any internet-enabled device that is connected to a venue 200's audiovisual system 206 in any manner. In yet another embodiment, the media player 204 acts as a conduit through which a digital media file is streamed to the venue 200. In some embodiments, the media player 204 includes an administrative console with which a user at a venue 200 (such as management or employees) can manage the media files available for streaming or on demand play at the venue.

In some embodiments, the media player 204 includes a user interface with which a user of the client 102a interacts. In other embodiments, the client 102a displays a user interface through which the user of the client 102a may interact with a user of a second client 102b, such as a user that is also local to the computing device 106b. For example, a first user may add a second user to a list of favorite users or to a third party site (e.g., following the second user on a micro-blogging site). In another example, the first user and second user may interact by playing games or interacting with other applications together. In a further example, the first user and the second user may interact by cooperating to increase the likelihood that media files they both prefer will be broadcast in a venue. In still another example, the user interface allows the users to exchange messages.

In one embodiment, the client 102a executes an application 212 with which it may interact with the media selection component 202. The application 212 may be referred to as a selector 212. In some embodiments, the client 102a itself is referred to as a selector 212. In other embodiments, a selector 212 is any internet-enabled device used to browse the remotely located media database 208 via the media selection component 202. In these embodiments, the selector 212 may be any computing device, including by way of example, the computing devices described above in connection with FIGS. 1A-1D.

In some embodiments, a user of the selector 212 may choose a media file from the remotely located media database 208 and request, from the media selection component 202, the broadcasting of that media file by the media player 204 via the venue entertainment system 206. In other embodiments, the selector 212 may communicate with the media selection component 202 even if the selector is not within the venue 200. In still other embodiments, the selector 212 may access data stored by the media selection component 202 on the computing device 106a including, without limitation, a venue 200's on-demand media catalog and other data associated with media files, venue information, user information, social networking data and gaming statistics. In one of these embodiments, the selector 212 displays, to a user, an enumeration of users in the venue 200, receives a request from the user to broadcast a media file, and sends the request to the media selection component 202 on behalf of the user. For example, and without limitation, a first user outside the venue 200 accesses the selector 212 and sees that a friend of his is in the venue 200; the first user may initiate the broadcast of a media file preferred by the friend, including a message for the friend. For example, the first user may request that the media player 204 play the friend's favorite song and a "shout-out" message to the friend saying that the user is thinking of him.

In some embodiments, a user interface is provided within a third-party system. In one of these embodiments, the user interface allows a user to interact with the media selection component 202 when the user is outside of the venue 200. In another embodiment, the user interface may be embedded within a third-party social networking site. For example, and without limitation, a user viewing data on a third-party social networking site from her home may view an enumeration of individuals with whom she is connected on the social networking site and who are currently physically at the venue 200. The user may request that the media player 204 broadcast a media file—such as a song with a dedication to the individuals—from within the social networking site via the user interface. In some embodiments, the user interface displays the credits or account balance available to the user and she may use those resources to pay for the broadcast.

In one embodiment, the venue entertainment system 206 includes the audiovisual equipment provided by a venue, which may include, for example and without limitation, media players such as CD/MP3/DVD players, speakers, sound mixers, LP records, turntables, lighting, visual effects accessories, microphones, MIDI keyboards and controllers, television sets, projectors, set top boxes and signal processing equipment.

Figure 2B:
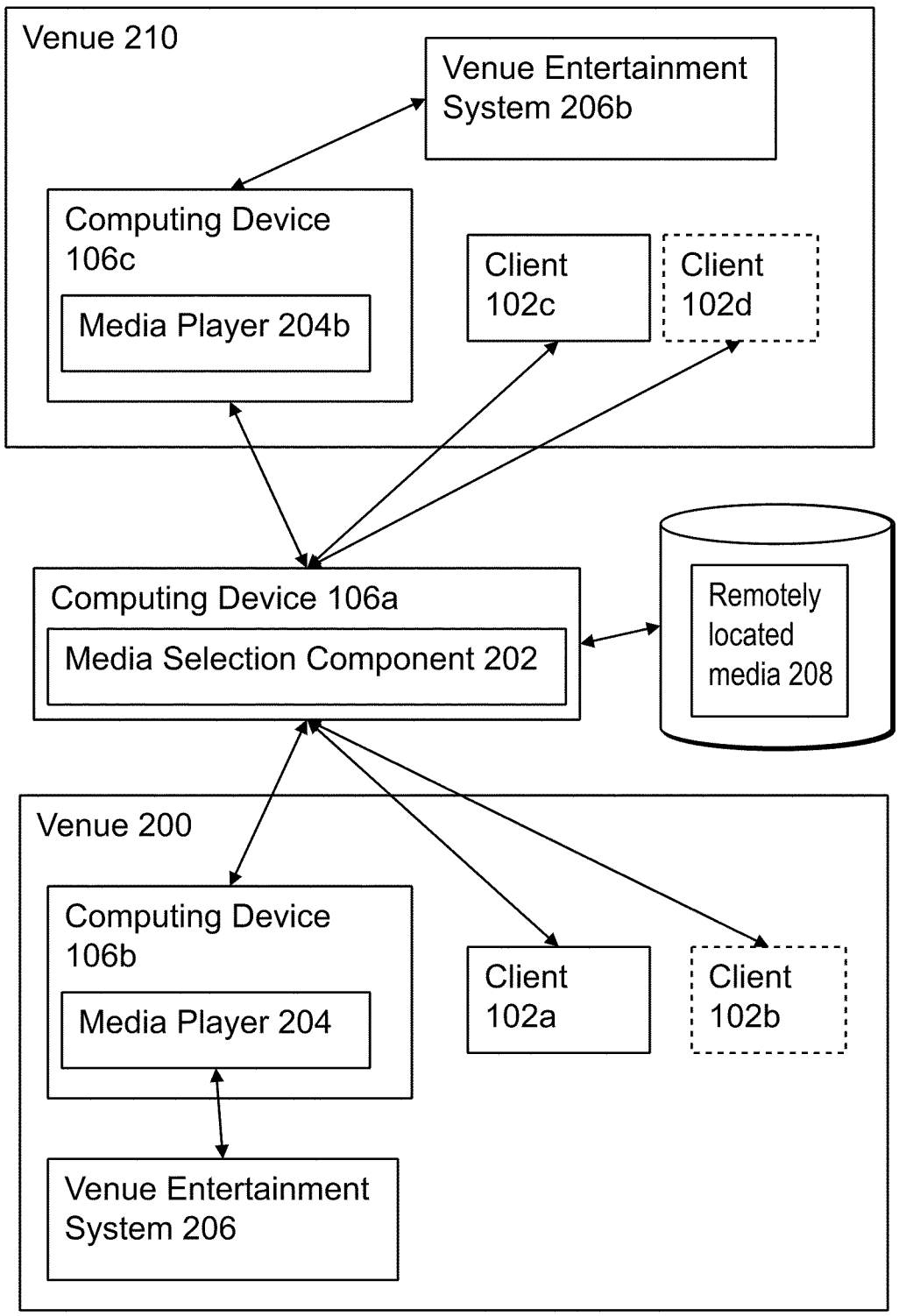
FIG. 2B is a block diagram depicting another embodiment of a system for analyzing user preferences to dynamically identify remotely located media for local access.

Referring now to FIG. 2B, a block diagram depicts another embodiment of a system for analyzing user preferences to dynamically identify remotely located media for local access. As depicted in FIG. 2B, and in some embodiments, a second venue 210 includes a third computing device 106c, a second media player 204b, a second venue entertainment system 206, and at least one client 102c. FIG. 2B depicts an embodiment in which multiple venues interact with the media selection component 202 and in which media players 204 at each of the various venues receive and play streamed files from the remotely located media database 208.

Figure 3A:
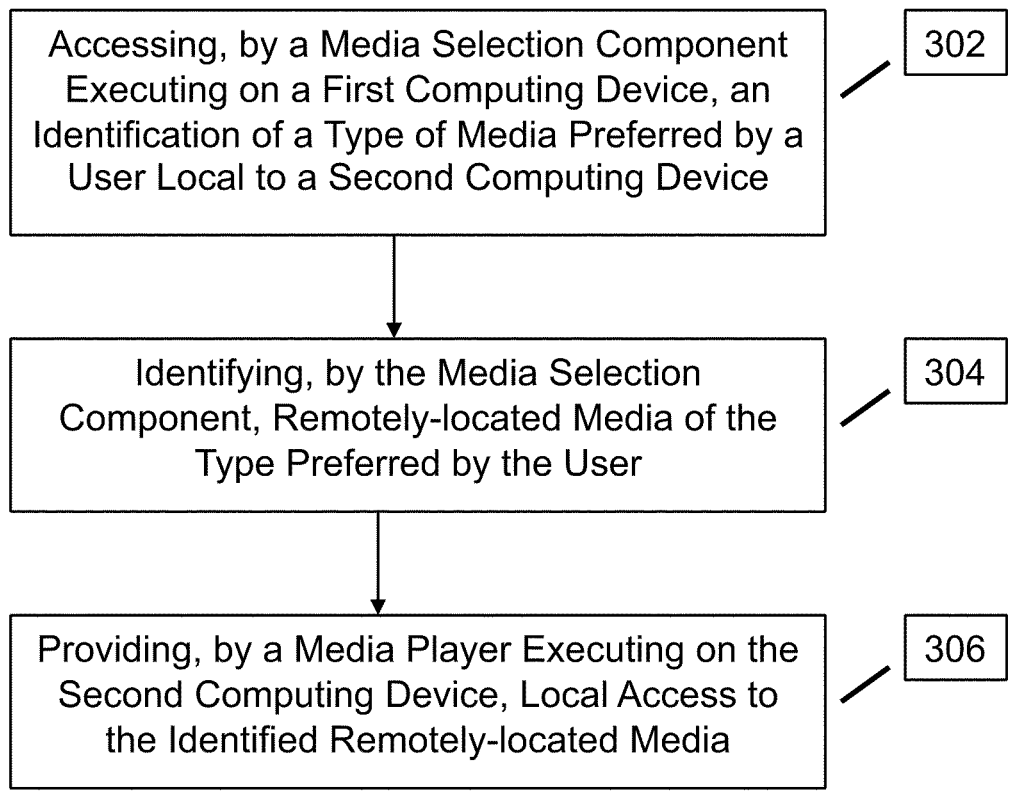
FIG. 3A is a flow diagram depicting an embodiment of a method for analyzing user preferences to dynamically identify remotely located media for local access

Referring now to FIG. 3A, a flow diagram depicts one embodiment of a method for analyzing user preferences to dynamically identify remotely located media for local access. The method includes accessing, by a media selection component executing on a first computing device, an identification of a type of media preferred by a user local to a second computing device (302). The method includes identifying, by the media selection component, remotely located media of the type preferred by the user (304). The method includes providing, by a media player executing on the second computing device, local access to the identified remotely located media (306).

In some embodiments, the venue 200 uses the system to select media to stream over the venue entertainment system 206 when no users have made requests for access to a particular media file. In one of these embodiments, the media selection component 202 arbitrarily selects media files from the remotely located media database 208 for broadcasting. In another of these embodiments, the media selection component 202 selects media files for broadcasting based upon preferences of previous users. In one embodiment, the media selection component 202 receives a notification from the selector 212 that a user of the selector 212 has entered a venue 200 or is physically proximate to the venue 200; the media selection component 202 queries the user's preference data (including, for example, without limitation, the user's selection history during previous interactions with the selector 212 or media identified as a favorite by the user either during use of the selector 212 or during of a third party system) and automatically sculpts the venue's media stream to accommodate the user's preferences. In some embodiments, system users are awarded points based on several factors including but not limited to activity level, paid selections, approval rating, referral bonuses, and other factors. In one of these embodiments, users with a greater score will have a greater influence on the stream.

Referring now to FIG. 3A, and in greater detail, the media selection component 202, executing on the first computing device 106a, accesses an identification of a type of media preferred by a user local to a second computing device 106b (302). In some embodiments, the identification of the type of media preferred by the user includes, without limitation, an identification of a preferred artist, genre, time period, and content. In other embodiments, the identification of the type of media preferred by the user is an identification of media most recently accessed by the user, including media recently re-broadcast and recently acquired media. In further embodiments, the media selection component 202 accesses user preferences including, without limitation, any media that the user has consumed, used, interacted with or the like, outside of the system; the media that the user has consumed, used, commented upon, or voted for or against within the system; as well as the media that those in the user's networks of direct and indirect connections within the system, or through a third party system, have used, consumed, interacted with or the like, outside of the system. By way of example, and without limitation, third parties with which the media selection component 202 may interact to access user preferences include systems such as those maintained by, for example, Last.fm Ltd. of London, UK; Facebook, Inc., of Palo Alto, Calif., USA; Apple Inc., of Cupertino, Calif., USA; and Pandora Media, Inc., of Oakland, Calif., USA.

In one embodiment, the media selection component 202 accesses the identification of the type of media the user prefers via a number of mechanisms including, without limitation: scanning the media stored on the user's personal computing device (e.g., any computing device, such as the computing device 100 described above in connection with FIGS. 1A-1D); collecting the user's votes and ratings on media and media producers, and integrating their preferences as defined in other third party services; integrating the preference of other individuals connected to the user, such as the preferences of the user's social connections, to determine the likely preferences of the user (for example, by analyzing the user's direct and indirect social connections both within the system and through third party social networking applications to collect the media preferences of the user's social connections and incorporate that data into decisions regarding what media to broadcast when the user is in the venue).

In one embodiment, upon scanning the media stored on the user's personal computing device, the media selection component 202 collects at least one of: (i) metadata associated with the media and (ii) other media usage statistics stored on the personal computing device. In another embodiment, the user may interact with the media selection component 202 (e.g., via the selector 212) to manually enter the identification of the type of media the user prefers. In still another embodiment, the media selection component 202 displays an upcoming or sample media play list to the user and allows the user to indicate an approval or disapproval of the media included in the play list; the media selection component 202 collects the user indications and stores at least one of the user indications as an identification of a type of media preferred by the user. In yet another embodiment, the media selection component 202 dynamically modifies the upcoming media play list responsive to at least one of the user indications; for example, the media selection component 202 may remove media the user disapproves of or add additional media having characteristics similar to media the user approved.

In one embodiment, the media selection component 202 integrates the user's votes, ratings, and other expressions of media preferences through third party services. Several services allow for the user to express approval or disapproval of media and media producers. In this embodiment, the media selection component 202 accesses the preference data stored on these third party services to identify media to include in a venue's play lists when the user is in the venue.

In one embodiment, the media selection component 202 queries a database storing preferences for that user. For example, if the user has accessed the media selection component 202 previously, the media selection component 202 may have stored, in a database, an identification of media the user preferred in that session (such as media most recently requested by the user). As another example, the media selection component 202 may query a database storing preferences for that user maintained by a third party—such as a retailer from which the user previously acquired data or to which the user previously provided an indication of his or her preferences (such as a wish list or favorites section in an online retailer's web site). In another embodiment, the media selection component 202 requests, from a third computing device 106c, data including at least one identification of media recently accessed by the user. For example, a third party media retailer may not make its internal databases directly available to the media selection component 202 but may maintain a computer that receives requests from the media selection component 202 and decides whether and what data to transmit to the media selection component 202 in response to the request.

In one embodiment, the media selection component 202 accesses media preference data stored by a third computing device. As an example, the user may execute the selector 212 from a client computing device 102a that stores data associated with the user's media preferences; the media selection component 202 may query the client computing device 102a to retrieve at least one identification of a type of media preferred by the user. In another example of this embodiment, the selector 212 may scan the user's library of music on the client computing device 102a and send the results to the media selection component 202 for analysis and matching to media stored in the remotely located media database 208.

In one embodiment, the media selection component 202 queries a database including at least one identification of media recently accessed by the user. For example, the media selection component 202 may interact with a database on the client 102a storing an identification of media recently accessed by the user—such as a media player on a smartphone that keeps track of most recently played songs. In another embodiment, the media selection component 202 queries a database to identify recently played media. In still another embodiment, the media selection component 202 queries a database to identify media that the user identified as preferred (e.g., by "voting" up or down on a song).

The media selection component 202 identifies remotely located media of the type preferred by the user (304). In one embodiment, the media selection component 202 searches a database of media (e.g., the remotely located media database 208) for media containing an identification of a type of media that matches the identification of the type of media the user prefers. By way of example, upon accessing an identification of a type of media the user prefers that identifies a specific artist or genre, the media selection component 202 may search the remotely located media database 208 for media generated by the identified artist or categorized as belonging to the identified genre. In other embodiments, the media selection component 202 communicates with a third party recommendation system to identify the remotely located media of the type preferred by the user. Third party recommendation systems include, without limitation, systems such as those distributed by The Echo Nest of Somerville, Mass., USA; The Filter, c/o Exabre, Ltd., of Bath, United Kingdom; and Rovi Corporation of Santa Clara, Calif., USA.

In one embodiment, and as will be described in additional detail below in connection with FIGS. 3B-3E, to identify remotely located media to broadcast in a venue 200, the media selection component 202 analyzes at least one of a number of users in a venue and data associated with the at least one of the number of users, the data including, for example and without limitation, whether one user has a higher priority than another, a media preference of a particular user, frequency of each of the users' presence in the venue 200, frequency and type of interaction between the user and the system, the users' social connections to other users in the same venue 200, the date and time of the system usage, the preferences of the owner or administrator of the venue 200, the audiovisual qualities of individual pieces of media, the quantity and duration of individual users' previous engagement with the system.

The media player, executing on the second computing device 106b, provides local access to the identified remotely located media (306). In one embodiment, the media selection component 202 directs the media player 204 to provide local access to the identified remotely located media; for example, the media selection component 202 may transmit an instruction to the media player 204 including an identification of a file stored in the remotely located media database 208 and instruction to stream the file for local rebroadcasting. In another embodiment, the media selection component 202 streams the identified remotely located media from the database 208 to the media player 204. In still another embodiment, the media selection component 202 directs a third computing device to stream a file from the remotely located media 208 to the media player 204. In yet another embodiment, the media player 204 broadcasts the streamed file throughout the venue 200. In some embodiments, the media selection component 202 directs the media player 204 to display an identification of the user when the media player 204 broadcasts the media file in the venue 200. In one of these embodiments, for example, the media player may display a name, photograph or other information about the user on a television set of the venue entertainment system 206. In other embodiments, the media selection component 202 directs the selector 212 to display, to the user, an identification of the remotely located media. In one of these embodiments, for example, the media selection component 202 may first direct the media player 204 to broadcast the media file and then direct the selector 212 to inform the user that media reflecting the user's preferences has been broadcast in the venue 200. In another of these embodiments, the selector 212 includes a user interface allowing the user to respond to the display; for example, the user interface may allow the user to share the display with friends, post the display to a micro-blogging or social networking site, or provide an indication that they approve of the selected media file (or conversely that they do not prefer the type of media being broadcast).

In some embodiments, the media player 204 provides local access, via the venue entertainment system 206, to media stored on a client device 102a. In one of these embodiments, the media selection component 202 identifies media to have played, determines that the media is available on the client device 102a, and directs the media player 204 to access the client device 102a to provide local access to the media.

In one embodiment, the media selector 202 receives, from the user of the selector 212, a request for local access to additional remotely located media. For example, the user may transmit a request to the media selection component 202 for broadcasting of a particular media file. In another embodiment, the media selector component 202 receives, from the user of the selector 212, a payment accompanying the request for local access to the additional remotely located media. In still another embodiment, the media selector component 202 receives an identification of a redemption code with which a user pays for a song (e.g., having received free song plays or credits as part of an incentive system). In some embodiments, users can select media to play on demand, publicly at the venue. This includes but is not limited to songs, music videos, sports highlights, and video clips. In one embodiment, selecting media for play at the venue is done indirectly, for example, by purchasing system credits, which are then redeemed for on demand song plays. In some embodiments, the user requesting the playing of the media is promoter requesting a promotional play of media. In other embodiments, the user requesting the playing of the media is an advertiser requesting playing of advertising media. In still other embodiments, the user is a person at a venue who wishes to hear a particular media file.

In another embodiment, a user can purchase media for downloading, request media to be added to the venue library (e.g., the remotely located media database 208), or request that a new venue join the system. In some embodiments, an end user may view all of the media available for play at the venue, recommend new media to be added to the venue's library, and see a list of popular files.

In one embodiment, a dynamic pricing model is provided. In this embodiment, a user purchases credits on the system and then uses those credits to select a media file. Often at a busy venue, a queue of selected media files can be quite long. In such a case, the system allows a user to see where in the queue her selected media will play and further allows her to elevate its priority by paying additional credits. This dynamic pricing embodiment also allows for the discounted pricing of available media files based on user information, promotional activities, social gaming rewards, loyalty programs. In other embodiments, the system allows for an editable selections queue whereby a user can reorder the files she has selected for play as long as they are still in the queue. In some embodiments, users may bid against each other to increase the priority of a media file in the queue. In other embodiments, users may collaborate to increase the priority of a media file; for example, a first user may pay to increase the priority of a media file in the queue and a second user may pay additional credits to further increase the priority of the media file.

In one embodiment, the methods and systems described herein provide functionality for generating a dynamic play list in which the media included in the play lists changes as users enter and leave a venue. In one embodiment, the media selection component 202 determines that a preference of a second user local to the second computing device 106b has priority over a preference of the first user local to the second computing device 106b in venue 200. The media selection component 202 accesses an identification of a second type of media preferred by the second user and identifies remotely located media of the second type. The media player 204 provides local access to the identified remotely located media of the second type.

In one embodiment, the media selection component 202 determines when a user has entered a venue 200 by determining when new computing devices enter the venue 200. In another embodiment, the media selection component 202 identifies personal computing devices likely within range of the venue 200 using any number of methods including but not limited to global positioning satellite navigational chips and wireless network triangulation. In still another embodiment, users manually inform the system of their presence within the venue 200; for example, via a manual input or "check-in" mechanism.

In some embodiments, the preferences of the second user may have priority over the preferences of the first user because the second user has paid for a higher priority, for example by buying a premium level of membership or by making a one-time payment to increase a level of priority during participation at a particular event, at a particular venue, or to gain local access to a particular media file. In another embodiment, the preferences of the second user may have priority over the preferences of the first user because the second user is a more active user of the system; for example, and without limitation a user who regularly accesses the system, interacts with other users, makes requests for media, or otherwise accesses the functionality provided may have a higher level of priority than a user with a lower level of participation.

Figure 3B:
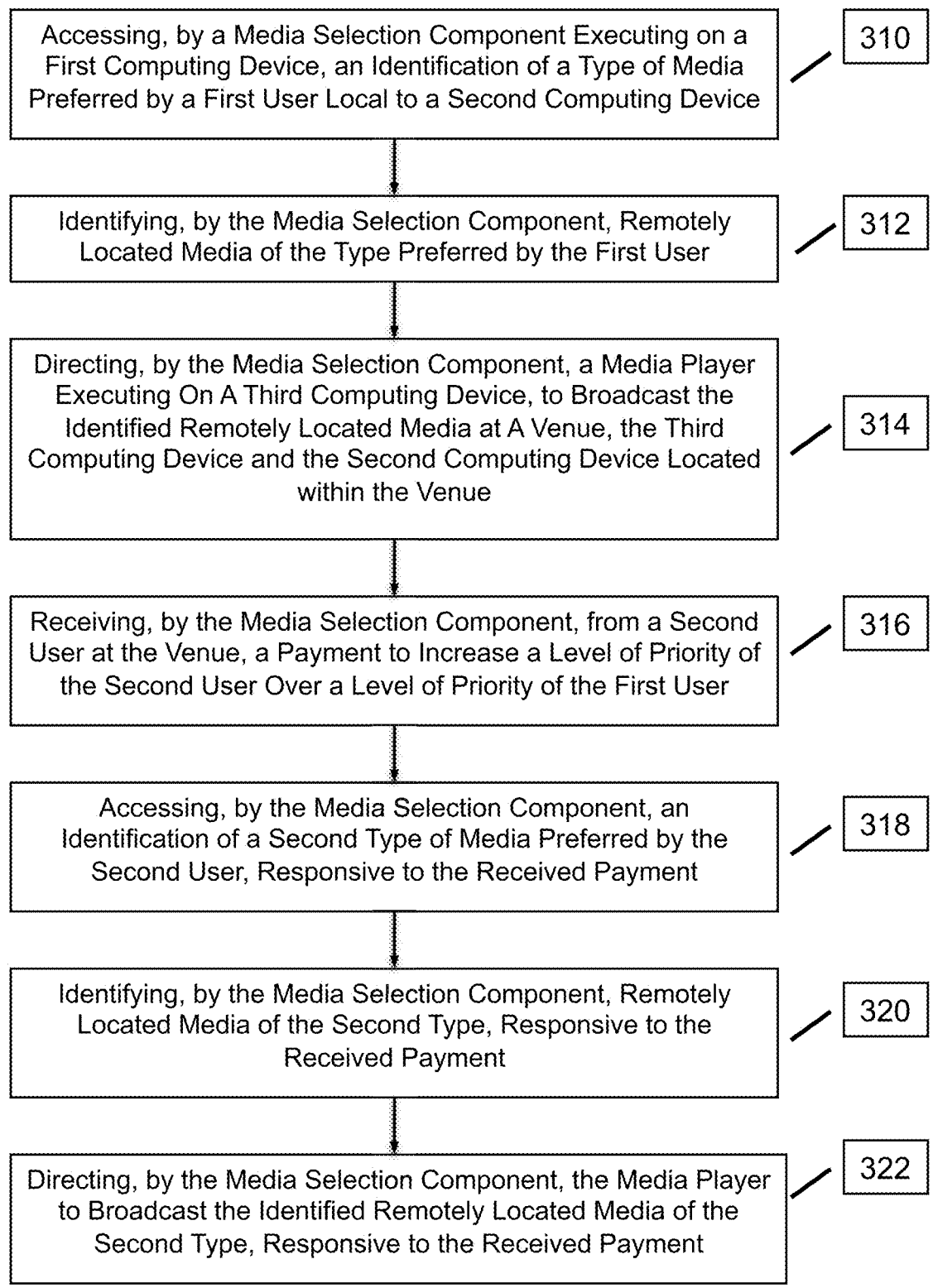
FIG. 3B is a flow diagram depicting an embodiment of a method for analyzing user preferences to dynamically identify remotely located media for local access.

Referring now to FIG. 3B, a flow diagram depicts an embodiment of a method for analyzing user preferences to dynamically identify remotely located media for local access. In brief overview, the method includes accessing, by a media selection component executing on a first computing device, an identification of a type of media preferred by a first user local to a second computing device (310). The method includes identifying, by the media selection component, remotely located media of the type preferred by the first user (312). The method includes directing, by the media selection component, a media player executing on a third computing device, to broadcast the identified remotely located media at a venue, the third computing device and the second computing device located within the venue (314). The method includes receiving, by the media selection component, from a second user in the venue, a payment to increase a level of priority of the second user over a level of priority of the first user (316). The method includes accessing, by the media selection component, an identification of a second type of media preferred by the second user, responsive to the received payment (318). The method includes identifying, by the media selection component, remotely located media of the second type, responsive to the received payment (320). The method includes directing, by the media selection component, the media player to broadcast the identified remotely located media of the second type, responsive to the received payment (322).

Referring now to FIG. 3B, and in greater detail, the method includes accessing, by a media selection component executing on a first computing device, an identification of a type of media preferred by a first user local to a second computing device (310). The method includes identifying, by the media selection component, remotely located media of the type preferred by the first user (312). In one embodiment, the media selection component 202 receives, from the second computing device 102a, an indication that the second computing device 102a is in the venue 200. In another embodiment, the media selection component 202 automatically identifies remotely located media of the first type preferred by the first user upon receiving the indication from the second computing device. In some embodiments, the media selection component 202 accesses the identification and identifies the remotely located media as described above in connection with FIGS. 2A-3A.

The method includes directing, by the media selection component, a media player executing on a third computing device, to broadcast the identified remotely located media at a venue, the third computing device and the second computing device located within the venue (314). The media player broadcasts the identified remotely located media at the venue. In one embodiment, the media selection component 202 directs the media player 204 to broadcast the identified remotely located media and the media player 204 does so as described above in connection with FIGS. 2A-3A.

The method includes receiving, by the media selection component, from a second user in the venue, a payment to increase a level of priority of the second user over a level of priority of the first user (316). In one embodiment, the second user accesses a computing device 102b to make the payment; for example, the second user may have installed a selector 212b on her mobile computing device 102b and may interact with the selector 212b to make the payment and request the increase in priority level.

The method includes accessing, by the media selection component, an identification of a second type of media preferred by the second user, responsive to the received payment (318). The method includes identifying, by the media selection component, remotely located media of the second type, responsive to the received payment (320). In some embodiments, the media selection component 202 accesses the identification and identifies the remotely located media as described above in connection with FIGS. 2A-3A.

The method includes directing, by the media selection component, the media player to broadcast the identified remotely located media of the second type, responsive to the received payment (322). In one embodiment, the media selection component 202 directs the media player 204 to broadcast the identified remotely located media and the media player 204 does so as described above in connection with FIGS. 2A-3A. In some embodiments, the media selection component 202 directs the media player 204 to broadcast promotional media of the type preferred by the first user, the promotional media paid for by an advertiser. In other embodiments, the media selection component 202 directs the media player 204 to broadcast promotional media of the type preferred by the second user, the promotional media paid for by an advertiser.

Figure 3C:
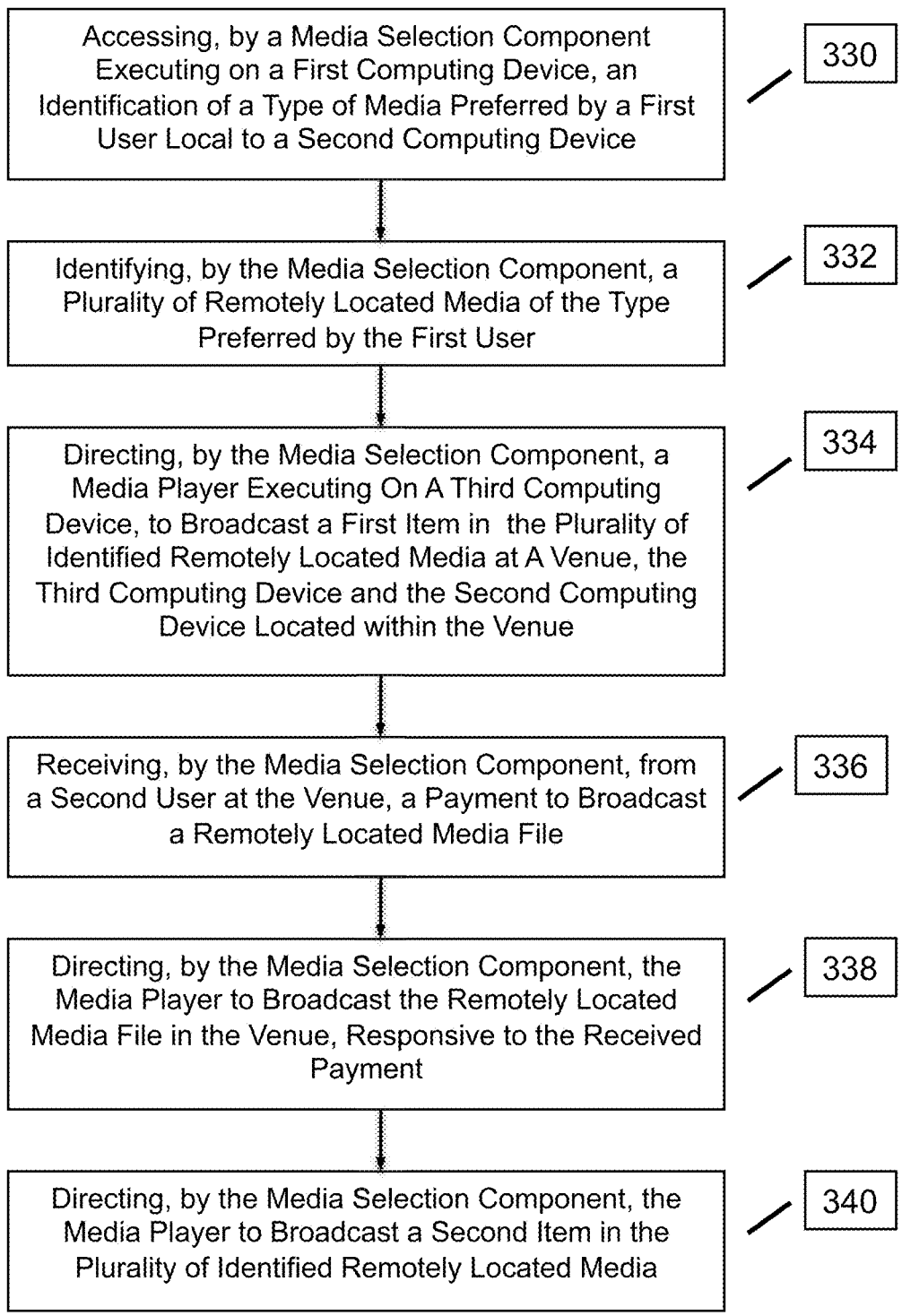
FIG. 3C is a flow diagram depicting an embodiment of a method for analyzing user preferences to dynamically identify remotely located media for local access.

Referring now to FIG. 3C, a flow diagram depicts an embodiment of a method for analyzing user preferences to dynamically identify remotely located media for local access. In brief overview, the method includes accessing, by a media selection component executing on a first computing device, an identification of a type of media preferred by a first user local to a second computing device (330). The method includes identifying, by the media selection component, a plurality of remotely located media of the type preferred by the first user (332). The method includes directing, by the media selection component, a media player executing on a third computing device to broadcast a first item in the plurality of identified remotely located media at a venue, the third computing device and the second computing device located within the venue (334). The method includes receiving, by the media selection component, from a second user in the venue, a payment and a request to broadcast a remotely located media file (336). The method includes directing, by the media selection component, the media player to broadcast the remotely located media file in the venue, responsive to the received payment (338). The method includes directing, by the media selection component, the media player to broadcast a second item in the plurality of identified remotely located media (340).

Referring now to FIG. 3C, and in greater detail, the method includes accessing, by a media selection component executing on a first computing device, an identification of a type of media preferred by a first user local to a second computing device (330). In one embodiment, the media selection component 202 accesses the identification of the type of media preferred by the first user as described above in connection with FIGS. 2A-3A.

The method includes identifying, by the media selection component, a plurality of remotely located media of the type preferred by the first user (332). In one embodiment, the media selection component 202 generates a play list of media (one or more media files) to be broadcast within the venue where the first user is located, based upon accessing the first user's preferences. In another embodiment, the media selection component 202 identifies the plurality of remotely located media as described above in connection with FIGS. 2A-3A. The method includes directing, by the media selection component, a media player executing on a third computing device to broadcast a first item in the plurality of identified remotely located media at a venue, the third computing device and the second computing device located within the venue (334). In one embodiment, the media selection component 202 directs the media player 204 to broadcast the identified remotely located media and the media player 204 does so as described above in connection with FIGS. 2A-3A.

The method includes receiving, by the media selection component, from a second user in the venue, a payment and a request to broadcast a remotely located media file (336). In one embodiment, the second user accesses a computing device 102b to make the payment; for example, the second user may have installed a selector 212b on her mobile computing device 102b and may interact with the selector 212b to make the payment and request the broadcasting of a particular media file.

The method includes directing, by the media selection component, the media player to broadcast the remotely located media file in the venue, responsive to the received payment (338). In one embodiment, the media selection component 202 directs the media player 204 to broadcast the identified remotely located media and the media player 204 does so as described above in connection with FIGS. 2A-3A.

The method includes directing, by the media selection component, the media player to broadcast a second item in the plurality of identified remotely located media (340). In one embodiment, after the media player 204 broadcasts the remotely located media file requested and paid for by the second user, the media player 204 returns to broadcasting media from the plurality of identified remotely located media of the type preferred by the first user.

In some embodiments, the media selection component 202 modifies the plurality of identified remotely located media when a second user pays to broadcast a particular media file. In one of these embodiments, the media selection component 202 identifies additional media files of a substantially similar type as the requested media file.

In other embodiments, the media selection component 202 receives, from the second user, an instruction to cancel the request to broadcast the remotely located media file. In one of these embodiments, for example, the second user may decide to leave the venue before the file is broadcast or change her mind about wanting to hear the file broadcast in the venue. In another of these embodiments, the media selection component 202 refunds, to the second user, the received payment. In still another of these embodiments, the credits are not charged until the user's selection is actually broadcast in the venue. For example, in a busy venue, there could be a long queue of selections and a user that has made a number of selections may wish to leave the venue before the selections have been delivered. In this embodiment, the user may cancel his selections and the credits will be returned to his account for later use.

In one embodiment, the methods described herein allows users to share media with the broadcast systems of the public venue, as well as with other users, third party social networking sites, and other websites. Further, it allows a user to create a play list from the selector 212 or a website for ease of later access or to share with other users. Other embodiments allow the user to synchronize her other media play lists from third party media sites.

In another embodiment, interactive social networking features are provided. Some of these features include the ability to see a listing of other users at a venue, or listed by geographical location. Others social features include the ability to create social connections with other users, share information including play lists, preferred venues, artists, or other information such as a particular artist's personal play list. Additionally, the social networking features allow users to comment on the media that is currently playing in the venue. In one embodiment, the system includes functionality allowing a user to vote a selection up or down. In another embodiment, the system may give awards (such as, by way of example, additional credits, points or other bonuses) to the users who selected the media. In one embodiment, users "check in" to a venue, announcing their presence at a venue, including those venues that have not installed the present invention. This "check in" data may be used for various innovative purposes including: to show demand for implementing the system at a venue, to collect user behavior data for better advertisement targeting, and to award points, trophies, and other rewards in the system's gaming features.

In one embodiment, innovative advertising models are used and integrated with consumer loyalty programs. For example, the user application features offers targeted by location, or specific to the user, or time of day, previous locations visited, or unique to a user's selected media files and their associated metadata. In another embodiment, the system provides artists, content producers, and content owners an innovative and powerful tool for engaging with fans. In this embodiment, users can navigate to an artist's customizable profile page where she can select media to play or download, see upcoming performance dates, buy tickets, engage with the artists directly, join fan clubs or mailing lists, see other users that are also fans of the artists, read news and information on the artists, view photos, and even discover similar artists according to the meta data the system associates with the artist's media files. In still another embodiment, the system provides social gaming features with game dynamics that engage users based on their media-related actions, locations visited, time of day, current geographical location, and other factors.

In some embodiments, a user engages with the selector 212 and/or the media selection component 202, even while she is not at a particular, public venue 200. For example, and without limitation, a user may engage in social gaming activities such as viewing personal gaming or system usage statistics and those of networked friends and other leaders. In other embodiments, the system provides a user with the ability to see venue-related data such as, without limitation, venues that are popular, currently trending, lists of commonly selected songs at the venue 200 and the current song queue at the venue 200. Other out-of-venue features include the delivery of artist information, and personalized recommendations for other artists and media that a user will likely enjoy based on their past interactions within the system.

Figure 3D:
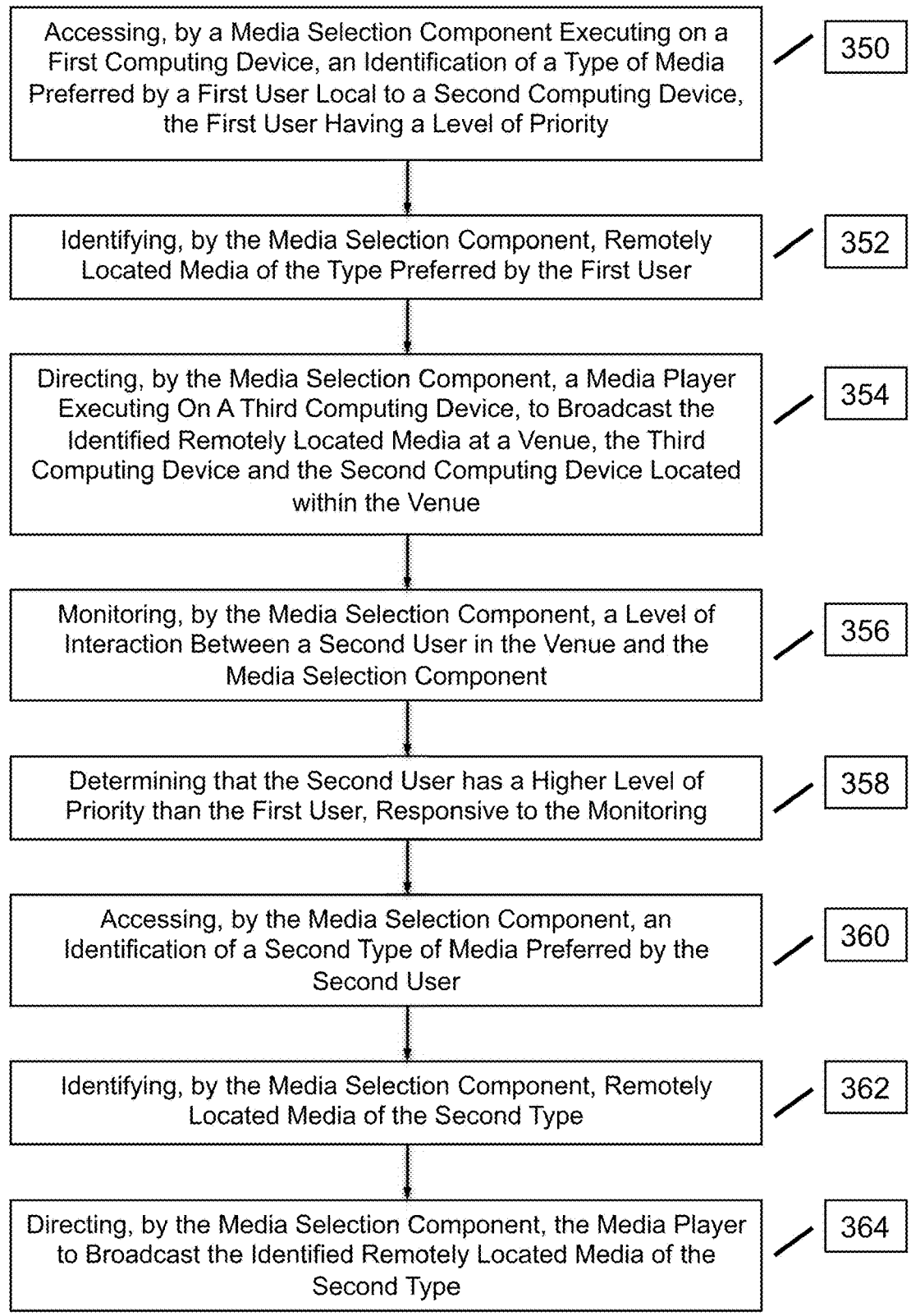
FIG. 3D is a flow diagram depicting another embodiment of a method for analyzing user preferences to dynamically identify remotely located media for local access.

Referring now to FIG. 3D, a flow diagram depicts an embodiment of a method for analyzing user preferences to dynamically identify remotely located media for local access. In brief overview, the method includes accessing, by a media selection component executing on a first computing device, an identification of a type of media preferred by a first user local to a second computing device, the first user having a level of priority (350). The method includes identifying, by the media selection component, remotely located media of the type preferred by the first user (352). The method includes directing, by the media selection component, a media player executing on a third computing device to broadcast the identified remotely located media at a venue, the third computing device and the second computing device located within the venue (354). The method includes monitoring, by the media selection component, a level of interaction between a second user in the venue and the media selection component (356). The method includes determining that the second user has a higher level of priority than the first user, responsive to the monitoring (358). The method includes accessing, by the media selection component, an identification of a second type of media preferred by the second user (360). The method includes identifying, by the media selection component, remotely located media of the second type (362). The method includes directing, by the media selection component, the media player to broadcast the identified remotely located media of the second type (364).

Referring now to FIG. 3D, and in greater detail, the method includes accessing, by a media selection component executing on a first computing device, an identification of a type of media preferred by a first user local to a second computing device, the first user having a level of priority (350). In one embodiment, the media selection component 202 assigns a level of priority to the first user based upon a payment received by the first user; for example, the first user may pay a certain amount for a regular level of priority or choose to pay a higher amount for a premium level of priority. In another embodiment, the media selection component 202 analyzes interactions between the first user and the media selection component 202 to determine the level of priority; for example, a new user may receive a low level of priority while an active user who regularly checks in, requests broadcasts, or interacts with other users may receive a higher level of priority. In another example, and without limitation, certain types of interactions may impact the level of priority more than others.

The method includes identifying, by the media selection component, remotely located media of the type preferred by the first user (352). The method includes directing, by the media selection component, a media player executing on a third computing device to broadcast the identified remotely located media at a venue, the third computing device and the second computing device located within the venue (354). In one embodiment, the media selection component 202 accesses the identification of the type of media preferred by the first user, identifies remotely located media of the preferred type, directs the media player to broadcast the identified remotely located media, and the media player does so as described above in connection with FIGS. 2A-3A.

The method includes monitoring, by the media selection component, a level of interaction between a second user in the venue and the media selection component (356). In one embodiment, the media selection component 202 tracks interactions between each user in a plurality of users and the media selection component 202. For example, when a user requests the broadcasting of a media file whether paid or unpaid, requests an increased level of priority over other users whether paid or unpaid, indicates a preference for or against a particular media file (e.g., by voting a song up or down), or interacts with other users, the media selection component 202 tracks the interaction. The media selection component 202 may track how many interactions each user has and what type of interactions they are. In some embodiments, the data collection component described above in connection with FIG. 2A stores identifications of interactions for later analysis.

In one embodiment, the media selection component 202 monitors a number of times the second user votes for media files to be broadcast. In another embodiment, the media selection component 202 monitors a number of times the second user pays for media files to be broadcast. In another embodiment, the media selection component 202 monitors a number of times the second user participates in a game or other application executed by the venue for interaction by at least one user. In still another embodiment, the media selection component 202 monitors a number of times the second user communicates with other users in a venue. Although described here in terms of a first user and a second user, it should be understood that the media selection component 202 may monitor interactions between each of any number of users and the systems described herein.

The method includes determining that the second user has a higher level of priority than the first user, responsive to the monitoring (358). In one embodiment, the media selection component 202 compares the level of priority of the first user with the level of priority of the second user. In another embodiment, the media selection component 202 analyzes each user's interaction with the system to determine which user is a higher priority user.

The method includes accessing, by the media selection component, an identification of a second type of media preferred by the second user (360). The method includes identifying, by the media selection component, remotely located media of the second type (362). The method includes directing, by the media selection component, the media player to broadcast the identified remotely located media of the second type (364). In one embodiment, the media selection component 202 accesses the identification of the second type of media, identifies remotely located media of the second type, directs the media player to broadcast the identified remotely located media, and the media player does so as described above in connection with FIGS. 2A-3A.

Figure 3E:
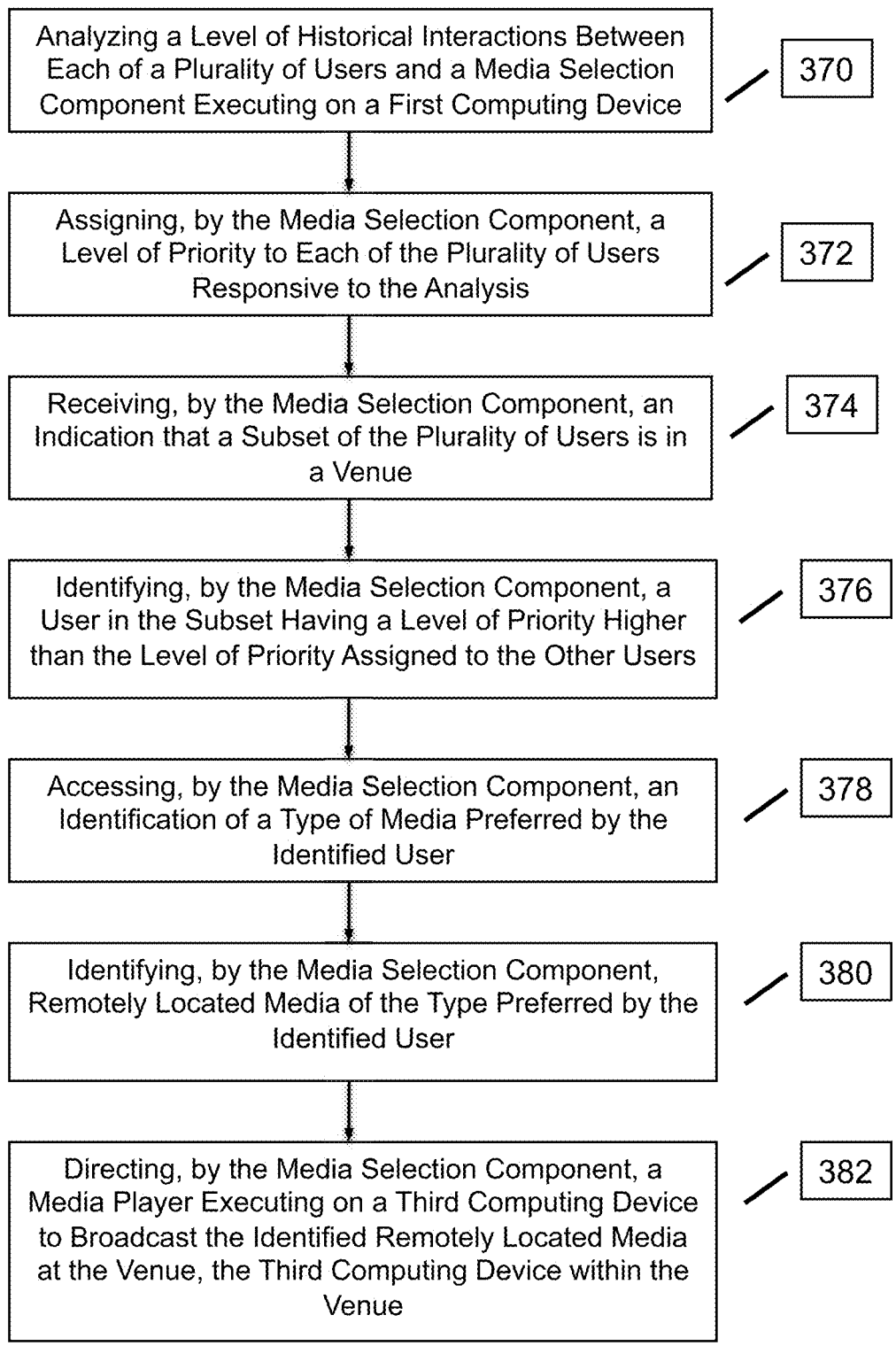
FIG. 3E is a flow diagram depicting another embodiment of a method for analyzing user preferences to dynamically identify remotely located media for local access.

Referring now to FIG. 3E, a flow diagram depicts an embodiment of a method for analyzing user preferences to dynamically identify remotely located media for local access. In brief overview, the method includes analyzing a level of historical interactions between each of a plurality of users and a media selection component executing on a first computing device (370). The method includes assigning, by the media selection component, a level of priority to each of the plurality of users responsive to the analysis (372). The method includes receiving, by the media selection component, an indication that a subset of the plurality of users is in a venue (374). The method includes identifying, by the media selection component, a user in the subset having a level of priority higher than the level of priority assigned to the other users (376). The method includes accessing, by the media selection component, an identification of a type of media preferred by the identified user (378). The method includes identifying, by the media selection component, remotely located media of the type preferred by the identified user (380). The method includes directing, by the media selection component, a media player executing on a third computing device to broadcast the identified remotely located media at the venue, the third computing device within the venue (384).

Referring now to FIG. 3E, and in greater detail, the method includes analyzing a level of historical interactions between each of a plurality of users and a media selection component executing on a first computing device (370). As described above in connection with FIG. 3D, and in one embodiment, the media selection component 202 monitors a number of times each of the plurality of users votes for media files to be broadcast. In another embodiment, the media selection component 202 monitors a number of times each of the plurality of users pays for media files to be broadcast. In another embodiment, the media selection component 202 monitors a number of times each of the plurality of users participates in a game or other application executed by the venue for interaction by at least one user. In still another embodiment, the media selection component 202 monitors a number of times each of the plurality of users communicate with other users in a venue.

The method includes assigning, by the media selection component, a level of priority to each of the plurality of users responsive to the analysis (372). In one embodiment, the media selection component identifies a number of interactions and maps the number to a level of priority. In another embodiment, interactions of different types are assessed as having different values and the media selection component 202 calculates the values and maps the values to a level. For example, and without limitation, a user may receive one point for checking in to a venue, may receive three points for paying for a media file to be broadcast, may receive two points for playing a game with another user, and may receive one point for voting up a song—the media selection component 202 identifies the number of points for each interaction, calculates a total, and uses the total to determine a level of priority to assign to the user. In another example, a user that checks in to venues regularly may have a higher level of priority than a new user who has not yet checked in but a lower level of priority than a user who checks in regularly and votes up songs and interacts with other users.

The method includes receiving, by the media selection component, an indication that a subset of the plurality of users is in a venue (374). As discussed above in connection with FIGS. 2A-3A, the media selection component may receive this indication from a computing device 106b in the venue 200 or from a selector 212 executing on a client 102a.

The method includes identifying, by the media selection component, a user in the subset having a level of priority higher than the level of priority assigned to the other users (376). In one embodiment, the media selection component 202 accesses the level of priority for each of the users in the subset. In another embodiment, the media selection component 202 updates the level of priority for each of the users in the subset. In still another embodiment, the media selection component 202 compares the levels of priority and identifies the user with the highest level.

The method includes accessing, by the media selection component, an identification of a type of media preferred by the identified user (378). The method includes identifying, by the media selection component, remotely located media of the type preferred by the identified user (380). In one embodiment, the media selection component 202 accesses the identification of the type of media and identifies the remotely located media as described above in connection with FIGS. 2A-3A. In another embodiment, the media selection component 202 identifies remotely located media of a type preferred by each of a subset of users. Although described in connection with FIG. 3E as selecting media files preferred by the higher priority user, the media selection component may select files preferred by a number of users—for example, the top 3, 5, 10 or "N" number of users as pre-defined by a venue operator or an administrator of the media selection component 202. In such an embodiment, the media selection component 202 identifies types of media preferred by individuals physically within a venue, improving their experience as well as, ideally, their impression of the venue 200.

The method includes directing, by the media selection component, a media player executing on a third computing device to broadcast the identified remotely located media at the venue, the third computing device within the venue (384). In one embodiment, the media selection component 202 directs the media player 204 to broadcast media files and the media player 204 does so as described above in connection with FIGS. 2A-3A.

Figure 4:
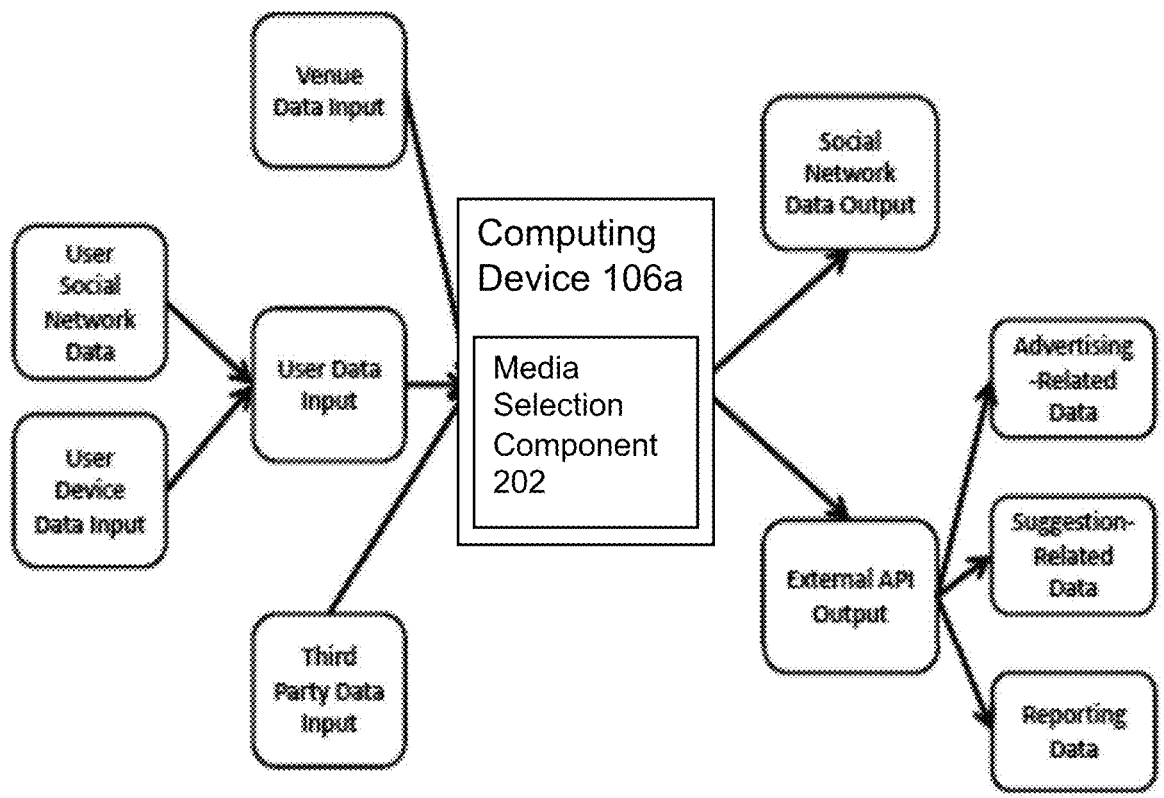
FIG. 4 is a block diagram depicting an embodiment of the media selection component in which the system aggregates user data for targeted advertisements and personalized recommendations.

Referring now to FIG. 4, a block diagram depicts an embodiment of the media selection component in which the system aggregates user data for targeted advertisements and personalized recommendations. FIG. 4 depicts inputs from which the system receives and aggregates data and outputs to which the system provides aggregated data. In one embodiment, the media selection component 202 aggregates user data and generates the targeted advertisements and personalized recommendations. In another embodiment, a third party advertisement engine aggregates user data and generates the targeted advertisements and personalized recommendations. In some embodiments, the computing device 106a collects and analyzes the data it receives from selectors 212, media players 204, and the remotely located media database 208. In one of these embodiments, the analyzed data includes but is not limited to data associated with media files, metadata, venue information, user information, social networking data, social graph data, and gaming statistics. The system uses this and other data to target the media and text advertisements that it broadcasts to a selector 212. The system may target these advertisements using location, time, user location history, demographic information, social graph information, and other relevant variables and metadata.

In another embodiment, the system collects and aggregates user data to provide targeted advertising; personalized recommendations for music, video, media, events, venues, etc.; and demographic data for advertisers and other third parties. In one embodiment, the computing device 106a is optimized to generate reports used for advertising, product development, media promotions, and other similar activities. In this embodiment, the computing device 106a utilizes the individual venue 200 media file selection information to produce reports on media trends across the network of interconnected devices including selectors 212, media players 204, media files, and other data. The computing device 106a collects and analyzes this information and report out useful data to the selector 212. A non-exclusive list of the data output includes the system's top media file charts for users, and several more detailed reports for content owners, producers, and artists. In another embodiment, analytical data reports include but are not limited to "now trending," a list of the most popular media files and venues in a particular city; "Top 100," a list of top media files by category over a user defined period of time; graphical heat maps of media file selections, popular genres by geography and more, both statically and over time series. Generating such usage information through the system and aggregating it with existing third party social network data through a socially-networked digital media platform is a novel approach for artists, developers and markers to target their products, plan tours, and run promotions.

As depicted in FIG. 4, the system may collect data from social networks in which the user participates ("Social Network Data Input"). In one embodiment, this data includes but is not limited to a user's favorite media groupings, third-party site memberships, venues visited, games played, social connections to other users on third-party sites, and social graph information. The "User Device Data Input" information includes but is not limited to any information regarding activity on the Selector, including, but not limited to, analyzing the media on users' devices, tracking what media files users select for on-demand play, download to keep, and select as a "favorite", and where these various actions take place. The computing device 106a also analyzes social graph information including: other users that have 'checked into' the same or similar venue a user has "checked in" to; the shared media, favorites, or downloads between a user and her friends; commonly attended venues; the daily frequency of use and common patterns of serialized venue visits.

In one embodiment, the computing device 106a analyzes received information. In another embodiment, the computing device 106a distributes the analyses through "Social Network Data Output" and "External APIs". In another embodiment, the computing device 106a broadcasts "Social Network Data Output" throughout the system (e.g., venues 200, 210), and to third party social networking sites; the data may include, without limitation, system activity, venues visited, media selections, specials completed, suggested friends, social gaming results, and other data. In still another embodiment, the computing device 106a generates "external API" data—selected aggregated usage data which is publicly available to partners, developers, and customers which is made publicly accessible and visualized according to methods commonly practiced in the art.

The methods and systems described herein provide functionality allowing users to interact with the system and with other users through any internet-connected device or public networked terminal. In one embodiment, these methods and systems allow a user to perform a variety of functions including, but not limited to, selecting media files for broadcast throughout a venue, engaging in social interaction with other users and through third party social networking sites, receiving advertising, offers, and other loyalty programs, viewing file data, playing social games, and managing the user's account. In another embodiment, these methods and systems identify users at a public venue—such as bars, retail stores, or cafes—via the users' personal computing devices and adjusting the non-interactive audio or video media stream at the venue to reflect the user preferences. In still another embodiment, a host or administrator of a private venue may also utilize the system to provide media access at a party or event.

It should be understood that the systems described above may provide multiple ones of any or each of those components and these components may be provided on either a standalone machine or, in some embodiments, on multiple machines in a distributed system.

The systems and methods described above may be implemented as a method, apparatus or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip, electronic devices, a computer-readable non-volatile storage unit, non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for analyzing user preferences to dynamically identify remotely located media for local access, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method performed by respective computer processors of a computing system including a first computing device and a third computing device, the computing system in communication with a second computing device, the respective computer processors executing computer program instructions stored on at least one non-transitory computer-readable medium to perform a method for broadcasting media responsive to analyzing user preferences to dynamically identify remotely located media, the method comprising:

receiving, by a media selection component executed by a respective computer processor of the first computing device, from a sponsor, at least one request to promote first media, the request including a request to broadcast a promotional play of the first media;

tracking, by a presence module, a physical location of a second computing device used by a non-sponsor user, the presence module in communication with a client application executing on the second computing device via at least one computer network and exchanging data identifying the physical location of the second computing device, the presence module executed by a respective computer processor of the third computing device, the second computing device and the third computing device physically located at a location remote from the first computing device;

determining, by the media selection component executed by the respective computer processor of the first computing device, based on data received from the presence module, via at least one computer network, that the second computing device is physically located within a venue;

scanning, by the media selection component executed by the respective computer processor of the first computing device, second media stored on the second computing device to access an identification of a type of media preferred by the non-sponsor user of the second computing device;

automatically identifying, by the media selection component executed by the respective computer processor of the first computing device, remotely located third media that is (i) of the type preferred by the non-sponsor user of the second computing device, and (ii) identified by the at least one request to promote first media, upon determining that the second computing device is physically located within the venue and responsive to scanning the media stored on the second computing device;

directing, by the media selection component executed by the respective computer processor of the first computing device, via the at least one computer network, the third computing device to broadcast the remotely located third media at the venue and to display an identification of the non-sponsor user, the third computing device and the second computing device located within the venue while the non-sponsor user is in the venue, without first receiving, from the non-sponsor user of the second computing device, a user request to broadcast the remotely located third media, wherein the directing is provided responsive to determining the physical location of the second computing device and to automatically identifying the remotely located third media;

broadcasting, by a media player executed by the respective computer processor of the third computing device at the venue, the remotely located third media on a venue entertainment system within the venue; and modifying, by the media player, a display of the venue entertainment system to include a display of an identifier of the non-sponsor user.

2. The method of claim 1 further comprising using the respective computer processor of the first computing device to request, from a fourth computing device, data including at least one identification of fourth media recently accessed by the non-sponsor user.

3. The method of claim 1 further comprising using the respective computer processor of the first computing device to direct a fourth computing device to stream to the third computing device the remotely located third media for local playback, the fourth computing device remote from the second computing device and from the third computing device.

4. A system for broadcasting media responsive to analyzing user preferences to dynamically identify remotely located media, the system comprising:

at least one computer processor of a first computing device executing computer program instructions stored on at least one non-transitory computer-readable medium, wherein the computer program instructions are executable by the at least one computer processor of the first computing device to perform a method for analyzing user preferences to dynamically identify remotely located media for local broadcast, the at least one computer processor of the first computing device:

receiving, from a sponsor, at least one request to promote first media, the request including a request to broadcast a promotional play of the first media, determining, based on data received from a presence module tracking a physical location of a non-sponsor user of a second computing device, via at least one computer network, that the second computing device is physically located within a venue, the presence module executed by at least one computer processor of a third computing device, the second computing device and the third computing device physically located at a location remote from the first computing device, scanning second media stored on the second computing device to access an identification of a type of media preferred by the non-sponsor user of the second computing device, automatically identifying remotely located third media of the type preferred by the non-sponsor user and identified by the at least one request to promote first media, upon determining that the second computing device is physically located within the venue and responsive to scanning the media stored on the second computing device, and initiating, via the at least one computer network, a broadcast of the identified remotely located third media and a display of an identification of the non-sponsor user while the non-sponsor user is in the venue, without first receiving, from the non-sponsor user of the second computing device, a user request to broadcast the identified remotely located third media; and a media player executed by the third computing device at the venue, broadcasting the identified remotely located third media on a venue entertainment system within the venue, and modifying a display of the venue entertainment system to include a display of an identifier of the non-sponsor user.

5. The system of claim 4 further comprising a third computing device in communication with the first computing device and storing at least one identification of a type of media preferred by the non-sponsor user.

* * * * *

UNITED STATES PATENT AND TRADEMARK OFFICE
CERTIFICATE OF CORRECTION

PATENT NO. : 10,580,030 B2  
APPLICATION NO. : 13/115842  
DATED : March 3, 2020  
INVENTOR(S) : Dodge et al.

Page 1 of 1

It is certified that error appears in the above-identified patent and that said Letters Patent is hereby corrected as shown below:

On the Title Page

Item (56), Column 2, Line 2, delete "Arlington" and insert -- (Arlington --, therefor.

In the Specification

Column 4, Line 67, delete "access" and insert -- access; --, therefor.

Column 5, Line 26, delete "owner" and insert -- owner. --, therefor.

Column 7, Line 46, delete "display 124" and insert -- display device 124 --, therefor.

Column 7, Line 48, delete "display 124" and insert -- display device 124 --, therefor.

Column 7, Line 10, delete "medium 116" and insert -- installation device 116 --, therefor.

Column 12, Line 29, delete "202" and insert -- 200 --, therefor.

Column 25, Line 45, delete "(384)" and insert -- (382) --, therefor.

Column 26, Line 57, delete "(384)" and insert -- (382) --, therefor.

Signed and Sealed this  
Thirtieth Day of June, 2020

Andrei Iancu  
*Director of the United States Patent and Trademark Office*